(12) United States Patent
Bharti et al.

(10) Patent No.: US 11,531,844 B2
(45) Date of Patent: Dec. 20, 2022

(54) USING MACHINE LEARNING AND/OR NEURAL NETWORKS TO VALIDATE STEM CELLS AND THEIR DERIVATIVES (2-D CELLS AND 3-D TISSUES) FOR USE IN CELL THERAPY AND TISSUE ENGINEERED PRODUCTS

(71) Applicant: The United States of America, as represented by the Secretary, Department of Health & Human Services, Rockville, MD (US)

(72) Inventors: Kapil Bharti, Potomac, MD (US); Nathan A. Hotaling, Washington, DC (US); Nicholas J. Schaub, Gaithersburg, MD (US); Carl G. Simon, Gaithersburg, MD (US)

(73) Assignee: The United States of America, as represented by the Secretary, Department of Health & Human Services, Bethesda, MD (US)

( * ) Notice: Subject to any disclaimer, the term of this patent is extended or adjusted under 35 U.S.C. 154(b) by 39 days.

(21) Appl. No.: 16/981,531

(22) PCT Filed: Mar. 15, 2019

(86) PCT No.: PCT/US2019/022611
§ 371 (c)(1),
(2) Date: Sep. 16, 2020

(87) PCT Pub. No.: WO2019/178561
PCT Pub. Date: Sep. 19, 2019

(65) Prior Publication Data
US 2021/0117729 A1  Apr. 22, 2021

Related U.S. Application Data

(60) Provisional application No. 62/644,175, filed on Mar. 16, 2018.

(51) Int. Cl.
*G06K 9/00* (2022.01)
*G06K 9/62* (2022.01)
(Continued)

(52) U.S. Cl.
CPC .......... *G06K 9/6257* (2013.01); *G06T 7/0012* (2013.01); *G06V 20/69* (2022.01);
(Continued)

(58) Field of Classification Search
None
See application file for complete search history.

(56) References Cited

PUBLICATIONS

Fan, K., et al.; "A Machine Learning Assisted, Label-free, Non-invasive Approach for Somatic Reprogramming in Induced Pluripotent Stem Cell Colony Formation Detection and Prediction", Scientific Reports, vol. 7, No. 1, Oct. 18, 2017 (Oct. 18, 2017), XP055505954, DOI: 10.1038/s41598-017-13680-x.
(Continued)

*Primary Examiner* — Soo Jin Park
(74) *Attorney, Agent, or Firm* — Leydig, Voit and Mayer, Ltd.

(57) ABSTRACT

A method is provided for non-invasively predicting characteristics of one or more cells and cell derivatives. The method includes training a machine learning model using at least one of a plurality of training cell images representing a plurality of cells and data identifying characteristics for the plurality of cells. The method further includes receiving at least one test cell image representing at least one test cell being evaluated, the at least one test cell image being acquired non-invasively and based on absorbance as an absolute measure of light, and providing the at least one test cell image to the trained machine learning model. Using machine learning based on the trained machine learning model, characteristics of the at least one test cell are predicted. The method further includes generating, by the trained machine learning model, release criteria for clinical preparations of cells based on the predicted characteristics of the at least one test cell.

19 Claims, 15 Drawing Sheets

(51) Int. Cl.
G06T 7/00 (2017.01)
G06V 20/69 (2022.01)

(52) U.S. Cl.
CPC .......... *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01)

(56) References Cited

PUBLICATIONS

Sadanandan, S.K., et al.; "Automated Training of Deep Convolutional Neural Networks for Cell Segmentation", Scientific Reports, vol. 7, No. 1, Aug. 10, 2017 (Aug. 10, 2017), XP055519890, DOI: 10.1038/s41598-017-07599-6.

Padia, S., et al.; "Comparison of Artificial Intelligence based approaches to cell function prediction"; ITL, National Institute of Standards & Technology, Gaithersburg, MD, USA; National Eye Institute, NIH, Bethesda, MD, USA; MML, National Institute of Standards & Technology, Gaithersburg, MD, USA; Published in final edited form as: Inform Med Unlocked 2020 ; 18.

Schaub, N.J., et al.; "Deep learning predicts function of live retinal pigment epithelium from quantitative microscopy"; Materials Measurement Laboratory, Biosystems and Biomaterials Division, National Institute of Standards and Technology, Gaithersburg, Maryland, USA; Department of Neurology, University of Michigan, Ann Arbor, Michigan, USA; Ocular and Stem Cell Translational Research Section, National Eye Institute, NIH, Bethesda, Maryland, USA; Information Technology Laboratory, Information Systems Group, National Institute of Standards and Technology, Gaithersburg, Maryland, USA; The Journal of Clinical Investigation, Copyright 2020, American Society for Clinical Investigation; Submitted: Jun. 19, 2019; Accepted: Nov. 6, 2019; Published: Jan. 21, 2020. Reference information: J Clin Invest. https://doi.org/10.1172/JCI131187.

USING MACHINE LEARNING AND/OR NEURAL NETWORKS TO VALIDATE STEM CELLS AND THEIR DERIVATIVES (2-D CELLS AND 3-D TISSUES) FOR USE IN CELL THERAPY AND TISSUE ENGINEERED PRODUCTS

This application is the U.S. National Stage of PCT International Application No. PCT/US2019/022611, filed Mar. 15, 2019, which claims the benefit of priority under 35 U.S.C. § 119(e) to U.S. Provisional Application No. 62/644,175, filed Mar. 16, 2018, which applications are incorporated herein by reference in their entirety.

STATEMENT OF RIGHTS TO INVENTIONS MADE UNDER FEDERALLY SPONSORED RESEARCH

This work was supported by the National Institute of Health (NIH), grant number ZIA EY000542-03. The Government has certain rights in this invention.

FIELD OF THE INVENTION

The disclosed embodiments generally relate to the predictability of cellular function and health, and more particularly, to using machine learning and/or neural networks to validate stem cells and their derivatives for use in cell therapy, drug discovery, and drug toxicity testing.

BACKGROUND

Many biological and clinical processes are facilitated by the application of cells. These processes include cell therapy (such as stem cell therapy), drug discovery, and testing toxic effects of compounds. Assays for cell death, cell proliferation, cell functionality, and cell health are very widely performed in many areas of biological and clinical research. Several kinds of assays are used to assess cell health, death, proliferations, and functionality, including but not limited to staining with dyes, antibodies, and nucleic acid probes. Barrier function assays, such as transepithelial permeability (TEP) and transepithelial electrical resistance (TER), provide useful criteria for toxicity evaluation and cell maturity. Other selected functional assays include, but are not limited to techniques using: electron microscopy (EM); gene (DNA or RNA) expression; or electrophysiological recordings, or techniques assessing secretion of specific cytokines, proteins, growth factors, or enzymes; rate and volume of fluid/small molecule transport from one side of cells to another; phagocytic ability of cells; immunohistochemical (IHC) patterns; and the like. Some of these assays can be used as "release" criteria to validate functionality of a cell therapy product before transplantation.

However, existing release assays used for cell therapies have significant limitations. Some of the aforementioned techniques are not quantitative, such as IHC and EM. Other release assays were found to exhibit a high degree of variability (e.g., cytokine release, TER) or were found to be too destructive (e.g., gene expression and phagocytosis) or too expensive (cytokine release and gene arrays). Also, current methods require, at a minimum, opening the cell culture dish to sample media and, at a maximum, require the complete destruction of the cells being measured. In several cases, these assays cannot be made throughout drug screening and toxicity testing and often do not provide high content information about cell health and functionality. This means that longitudinal assessment of cells with current methods as these cells grow, develop and differentiate, cannot occur without disturbing the cells, e.g., prior to administration to a patient or for testing drugs or toxic compounds. More specifically, many assays in current use increase the odds of contamination and/or inability to use the cells under examination in any further assessment/implantation, are not high throughput compatible and do not provide a complete overview of cell health.

Biologists can often predict whether certain types of cells (such as retinal pigment epithelial (RPE) cells) are functional just by looking at them under a bright-field/phase contrast microscope. This approach is non-invasive, versatile and relatively inexpensive. In spite of these advantages, image based analysis by humans has some drawbacks, such as, but not limited to, sampling bias, difficulty to directly correlate visual data and function and difficulty to draw causation.

Accordingly, in order to deliver cell and tissue therapies to patients and to discover novel drugs and potentially toxic compounds in a more efficient manner, there is a need in the art for automated analysis capable of addressing the above limitations of current approaches.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with aspects of the disclosure, a method is provided for non-invasively predicting characteristics of one or more cells and cell derivatives. The method includes training a machine learning model using at least one of a plurality of training cell images representing a plurality of cells and data identifying characteristics for the plurality of cells. The method further includes receiving at least one test cell image representing at least one test cell being evaluated, the at least one test cell image being acquired noninvasively and based on absorbance as an absolute measure of light, and providing the at least one test cell image to the trained machine learning model. Using machine learning based on the trained machine learning model, characteristics of the at least one test cell are predicted. The method further includes generating, by the trained machine learning model, release criteria for clinical preparations of cells based on the predicted characteristics of the at least one test cell.

In embodiments, the machine learning can be performed using a deep neural network, wherein the method can further include segmenting by the deep neural network an image of the test image(s) into individual cells.

Furthermore, in embodiments, the machine learning can be performed using a deep neural network, wherein the method further can include classifying the test cell(s) based on the characteristics.

In further embodiments, the predicting can be based on the classifying and can further include determining at least one of cell identity, cell function, effect of drug delivered, disease state, and similarity to a technical replicate or a previously used sample.

In embodiments, predicting the characteristics of the test cell(s) is capable of being performed on any of a single cell and a field of view of multiple cells in the at least one test cell image.

In embodiments, the method can further include visually extracting at least one feature from the test cell image(s). Training the machine learning model can be performed using the extracted at least one feature, wherein the predicting includes identifying at least one feature of the test cell(s) using the trained machine learning model as trained using the extracted at least one feature and predicting the characteristics of the test cell(s) using the at least one feature identified.

Furthermore, in embodiments, the test cell image(s) are acquired using quantitative bright-field absorbance microscopy (QBAM).

What is more, in embodiments, the method can further include receiving at least one microscopy image captured by a microscope and converting pixel intensities of the at least one microscopy image to absorbance values.

In embodiments, the method can further include at least one of calculating absorbance confidence of the absorbance values, establishing microscope equilibrium through benchmarking, and filtering color when acquiring the images.

Additionally, in embodiments, the first image processing of the test image(s) can be performed by the deep neural network.

In embodiments, the machine learning can be performed using a deep neural network, wherein the method can further include segmenting by the deep neural network an image of the at least one test image into individual cells, wherein the features are visually extracted from an individual cell that was segmented.

In embodiments, predicting the characteristics of the at least one test cell can include at least one of predicting trans-epithelial resistance (TER) and/or polarized vascular endothelial growth factor (VEGF) secretion, predicting function of the at least one test cell, predicting maturity of the at least one test cell, predicting whether the at least one test cell is from an identified donor, and determining whether the at least one test cell is outlier relative to known classifications In certain embodiments, generating the release criteria for clinical preparations of cells can further include generating, by the trained machine learning model, release criteria for drug discovery or drug toxicity.

Additionally, in embodiments, the plurality of cells and the test cell(s) can include at least one of embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and cancer stem cells (CSC).

In embodiments, the first plurality of cells and the test cell(s) can be derived from a plurality of the at least one of ESCs, iPSCs, NSCs, RPESCs, MSCs or HSCs or any cells derived therefrom.

Furthermore, in embodiments, the first plurality of cells and the test cell(s) can include primary cell types derived from human or animal tissue.

Additionally, in embodiments, the identified and the predicted characteristics can include at least one of physiological, molecular, cellular, and/or biochemical characteristics.

In embodiments, the at least one extracted features can include at least one of cell boundaries, cell shapes and a plurality of texture metrics.

What is more, in embodiments, the plurality of texture metrics can include a plurality of sub-cellular features.

Furthermore, in embodiments, the plurality of cell images and the test cell image(s) can include fluorescent, chemiluminescent, radioactive or bright-field images.

In embodiments, the method can further include determining a test image of the at least one test image is a large image, dividing the large image into at least two tiles, providing each of the tiles to the trained machine model individually, combining output of processing by the trained machine model associated with each of the tiles, and providing the combined output for predicting characteristics of the test cell(s) into a single output that corresponds to the large image.

In further aspects of the disclosure, a computing system is provided that performs the method disclosed.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DESCRIPTION OF CERTAIN EMBODIMENTS

Figure 1:
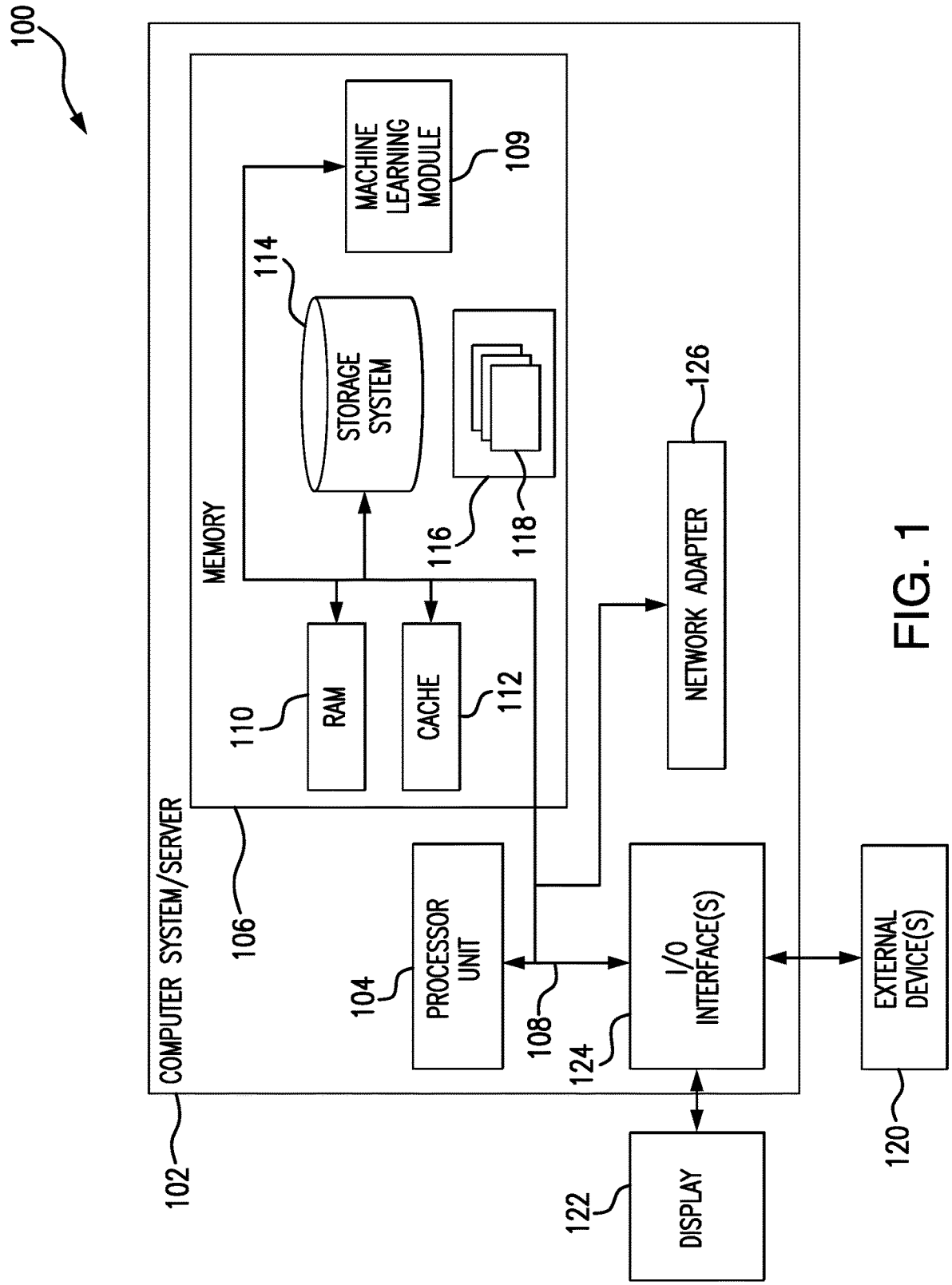
FIG. 1 is a block diagram illustrating one example of an operating environment according to one embodiment of the present disclosure.

The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the above-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

FIG. 1 illustrates a general overview of one operating environment 100 according to one embodiment of the present disclosure. In particular, FIG. 1 illustrates an information processing system 102 that can be utilized in embodiments of the present disclosure. The processing system 102, as disclosed in greater detail below can be used to validate transplant function in clinical biomanufacturing, including non-invasively predicting tissue function and cellular donor identity. The processing system 102 is compatible with advancements in developmental biology and regenerative medicine that have helped produce cell-based therapies to treat retinal degeneration, neurodegeneration, cardiopathies and other diseases by replacing damaged or degenerative native tissue with a new functional implant developed in vitro. Induced pluripotent stem cells (iPSCs) have extended the potential of cell therapies to permit transplantation of autologous tissues. The disclosed method that is supported by processing system 102 is performed noninvasively and overcomes barriers to large scale biomanufacturing, by eliminating the requirement for a trained user, allowing for high throughput, reducing cost, and reducing the time needed to make relevant predictions, such as regarding tissue function and cellular donor identity.

The information processing system 102 shown in FIG. 1 is only one example of a suitable system and is not intended to limit the scope of use or functionality of embodiments of the present disclosure described below. The information processing system 102 of FIG. 1 is capable of implementing and/or performing any of the functionality set forth below. Any suitably configured processing system can be used as the information processing system 102 in embodiments of the present disclosure.

As illustrated in FIG. 1, the components of the information processing system 102 can include, but are not limited to, one or more processors or processing units 104, a system memory 106, and a bus 108 that couples various system components including the system memory 106 to the processor 104.

The bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 106, in one embodiment, includes a machine learning module 109 configured to perform one or more embodiments discussed below. For example, in one embodiment, the machine learning module 109 is configured to apply selected machine learning to generate an output vector based on an input array of measurements using a machine learning predictive model. In another embodiment, the machine learning module 109 is configured to generate an output based on an input array of images using a deep neural network model, which are discussed in greater detail below. It should be noted that even though FIG. 1 shows the machine learning module 109 residing in the main memory, the machine learning module 109 can reside within the processor 104, be a separate hardware component capable of and/or be distributed across a plurality of information processing systems and/or processors.

The system memory 106 can also include computer system readable media in the form of volatile memory, such as random access memory (RAM) 110 and/or cache memory 112. The information processing system 102 can further include other removable/non-removable, volatile/non-volatile computer system storage media. By way of example only, a storage system 114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. The memory 106 can include at least one program product having a set of program modules that are configured to carry out the functions of an embodiment of the present disclosure.

Program/utility 116, having a set of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the present disclosure.

The information processing system 102 can also communicate with one or more external devices 120 such as a keyboard, a pointing device, a display 122, etc.; one or more devices that enable a user to interact with the information processing system 102; and/or any devices (e.g., network card, modem, etc.) that enable information processing system 102 to communicate with one or more other computing devices. Such communication can occur via I/O interfaces 124. Still yet, the information processing system 102 can communicate with one or more networks such as a local area network (LAN), a general wide area network (WAN), and/or a public network (e.g., the Internet) via network adapter 126. As depicted, the network adapter 126 communicates with the other components of information processing system 102 via the bus 108. Other hardware and/or software components can also be used in conjunction with the information processing system 102. Examples include, but are not limited to: microcode, device drivers, redundant processing units, external disk drive arrays, RAID systems, tape drives, and data archival storage systems.

Various embodiments of the present disclosure are directed to a computational framework utilizing novel neural networks and/or machine learning algorithms to analyze images of stem cells and/or analyze multiple cell types derived from these stem cells. At least in some embodiments, neural networks and/or machine learning can be used to automatically predict one or more physiological and/or biochemical functions of cells.

Images input to the information processing system 102 can be acquired using an external device 120, such as a bright-field microscope. The information processing system 102 can automatically process these images in real-time or at a selected time using quantitative bright-field absorbance microscopy (QBAM). QBAM uses absorbance imaging based on absorbance, which is an absolute measure of light. The QBAM method used can be implemented on any standard-bright field microscope, provides a statistically robust method for outputting reproducible images of high confidence image quality.

Specifically, applying QBAM includes converting pixels of an input image from relative intensity units to absorbance units that are an absolute measure of light attenuation. To improve reproducibility of imaging, QBAM calculates statistics on images in real time as they are captured to ensure the absorbance value measured at every pixel has a 95% confidence of 10 mill-absorbance units (mAU).

QBAM provides an advantage over methods that use raw pixel intensities, since raw pixel intensities can vary with microscope configuration and settings (e.g., uneven lighting, bulb intensity and spectrum, camera, etc.) that make comparison of images difficult, even when the images are captured on the same microscope. The method of the disclosure can thus provide automation, conversion of pixel intensities to absorbance values, calculation of absorbance confidence, and establishment of microscope equilibrium through the use of benchmarking for maximizing quality of image data captured with QBAM.

In scenarios where the images are processed using transmittance values, such as when using histology, calculated statistics can be modified to generate reproducible images of tissue sections. QBAM is generalizable to any multi-spectral modality since the calculations are not wavelength specific. The method of the disclosure can be suitable for hyperspectral autofluorescent imaging, which can identify cell borders and sub-cellular organization in non-pigmented cells.

The information processing system 102 can use one or more processing systems and/or software applications to process the received images, including to apply machine learning and/or deep neural network processing to the images, train a model, extract features, perform clustering functions, and/or perform classifying functions. In embodiments, images output by a microscope are converted from one format (e.g., CZI, without limitation) to another format (e.g., JPEG or TIFF, without limitation) before further processing is performed. In embodiments, script of an application, such as MATLAB® (without limitation) that receives the images from the microscope is adapted to manage the format output by the microscope. In embodiments, the received images and data obtained from the received images can be used by one or more different programs, such as MATLAB®, Fiji by ImageJ™, C++, and/or Python®. In embodiments, data can be manually transferred from one program to another. In embodiments, scripts are adapted to allow programs to transfer data directly between one another.

Accordingly, the disclosed method can be implemented in any clinical-grade bio-manufacturing environment or high throughput screening system, wherein the disclosed method needs only a bright-field microscope, a digital camera, and a desktop computer for analysis.

This description presents a set of data-driven modeling tools that can be employed to assess the function of human stem cells (such as, iPSCs and retinal pigment epithelial (RPE) cells). At least in some embodiments, this analysis of images is used to create lot and batch release criteria for clinical preparations of iPSCs and RPEs. In particular embodiments, the disclosed system may be utilized to deliver cell and different types of tissue therapies to patients in a more efficient manner In addition, the disclosed approaches may be used to tell the difference between: 1) cells of different sub-types, thus allowing the possibility of making or optimizing the generation of specific cells and tissue types using stem cells; 2) healthy and diseased cells, allowing the possibility of discovering drugs or underlying mechanisms behind a disease that can improve the health of diseased cells; and 3) drug and toxins treated cells, allowing the possibility of determining drug efficacy, drug side-effects, and toxin effects on cells, and combinations thereof. Each of these particular methods can be performed without disturbing the cells being studied, at a particular time, and/or over a period of time in a longitudinal study.

Figure 2A:
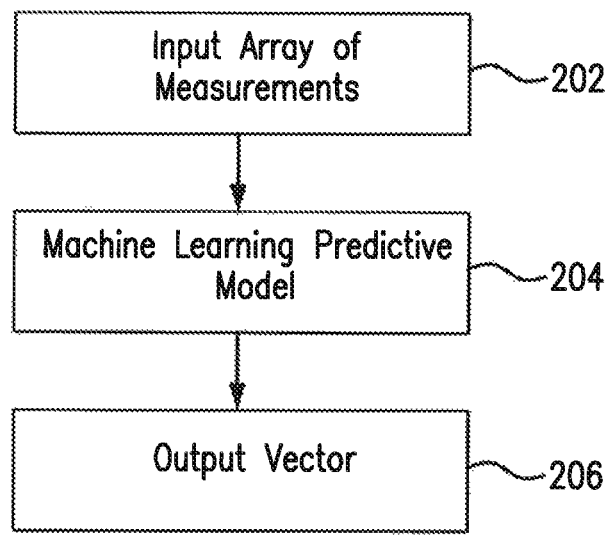
FIGS. 2A and 2B illustrate a selected machine learning framework and a deep neural network framework that might be used for predicting functions, identity, disease state and health of cells and their derivatives, according to an embodiment of the present disclosure.
Figure 2B:
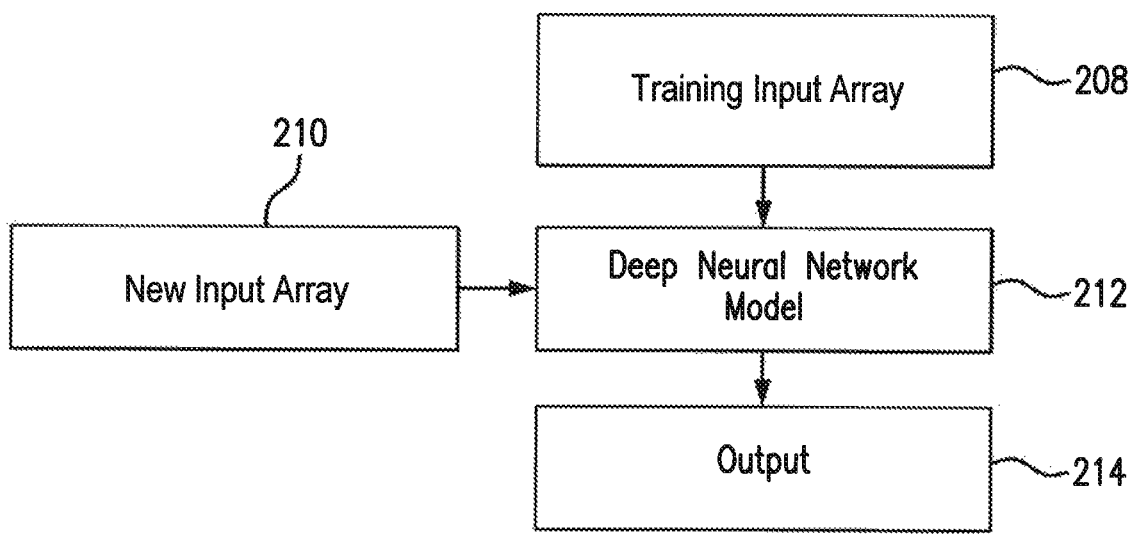

FIGS. 2A and 2B illustrate a selected machine learning framework and a deep neural network framework that might be used individually or together for predicting functions, identity, disease state and health of cells and their derivatives, according to an embodiment of the present disclosure.

In the embodiment illustrated in FIG. 2A, the machine learning predictive model 204 is trained to correlate the input data 202 through data driven statistical analysis approaches to generate a new interpretable model. In an embodiment, the input data 202 may include an input array of measurements representative of at least one physiological, molecular, cellular, and/or biochemical parameter of a plurality of stem cells or a plurality of stem cell derived cell types.

The input data 202 can be obtained from extracted visual features of individual cells that were extracted from QBAM images, e.g., using a web image processing pipeline (WIPP). The extracted visual features can be used to train selected machine learning algorithms to predict a variety of tissue characteristics including function, identity of the donor the cells came from, and developmental outliers (abnormal cell appearance). The selected machine learning algorithms can then be used to identify critical cell features that can contribute to prediction of tissue characteristics.

In various embodiments, the plurality of stem cells may include at least one of: embryonic stem cells (ESC), induced pluripotent stem cells (iPSC), neural stem cells (NSC), retinal pigment epithelial stem cells (RPESC), induced pluripotent stem cell derived retinal pigment epithelial cells (iRPE), mesenchymal stem cells (MSC), hematopoietic stem cells (HSC), cancer stem cells (CSC) of either human or animal origin or any cell types derived therefrom. In some embodiments, the input data 202 may include an input array of measurements representative of at least one physiological, molecular, cellular, and/or biochemical parameter of a plurality of primary cell types derived from human or any animal tissue.

In various embodiments the machine learning predictive model 204 may include one of multiple types of predictive models (dimension/rank reduction, hierarchical clustering/grouping, vector based regression, decision trees, logistic regression, Bayesian networks, random forests, etc.). The machine learning predictive model 204 is trained on similar cell metrics and is used to provide more robust groupings of both different patients and clones of iPSCS-derived RPE tissue engineered constructs. Thus, the machine learning predictive model 204 selects and ranks individual visual parameters of cells to generate output vector 206 representative of cells' physiological and/or biochemical functions, for example.

According to another embodiment of the present disclosure illustrated in FIG. 2B, a neural network framework employing, for example, a deep neural network model 212 is trained using a training input array 208 that includes labeled and/or defined images and/or data. The images of the training input array 208 depict microstructures of various stem cells or stem cell derived cell types. In one embodiment, each microstructural image may include a cell microstructure captured at preferably between 2× and 200× magnification. In addition or alternatively, the training input array 208 may include an array of images in which cell ultra or microstructural data has been highlighted with identifiers for which a researcher is interested, and may also include data identifying cell origin, cell location, a cell line, physiological data, and biochemical characteristics for the corresponding plurality of stem cells or stem cell derived cell types.

As described in greater detail below, the deep neural network model 212 is capable of consistently and autonomously analyzing images, identifying features within images, performing high-throughput segmentation of given images, and correlating the images to identity, safety, physiological, biochemical, or molecular outcomes.

Furthermore, the segmentations generated by the deep neural network model 212 can be overlayed back onto an original microstructural image of the training input array 208, and then image feature extraction can be performed on the microstructural images. A variety of quantitative cell information, including but not limited to, the cell morphometry (area, perimeter, elongation, etc.), intensity (mean brightness, mode, median, etc.) or texture (intensity entropy, standard deviation, homogeneity, etc.) can be calculated for individual features within cells, the cells themselves, or in tissue regions across distributions of stem cells or stem cell derived cell types.

The advantages of the deep neural network model 212 contemplated by various embodiments of the present disclosure include the combination of prediction reliability rendered by the training input array 208 and a capability of consistently revealing complex relationships between the images of cells and cell's identity, safety, physiological and/or biochemical processes.

Then, using the segmentations generated by the deep neural network model 212, selected machine learning methods can be applied to the features extracted from these images to identify which features within an image correlate to cell identity, safety, physiology, and/or biochemical processes. In addition, the deep neural network model 212 can mitigate an uncertainty of the training input array 208.

A key step provided by the deep neural network model 212 for predicting functions, identity, disease state and health of cells and their derivatives is the ability to automatically adjust groupings of parameters based on characterized images of the training input array 208 in a quantitative fashion. Various embodiments of the present disclosure are directed to a novel deep learning focused cell function recognition and characterization method so that recognition of various functions is possible with visual data alone. The method disclosed below should be considered as one non-limiting example of a method employing deep, convolutional neural networks for cell functionality characterization. Disclosed herein are a method and system for training the deep neural network model 212 to work with limited labeled data.

Other possible frameworks to be used for cell functionality characterization when a larger amount of annotated data is available typically utilize pixel-wise segmentation in a supervised setting. Examples of such methods/frameworks include, but are not limited to Fully Convolutional Networks (FCN), U-Net, pix2pix and their extensions. However, the framework of FCNs used for semantic image segmentation and other tasks, such as super-resolution, is not as deep (wherein depth is related to the number of layers) as the disclosed method's. For example, FCN network may accept an image as the input and produce an entire image as an output through four hidden layers of convolutional filters. The weights are learned by minimizing the difference between the output and the clean image.

One challenge of applying deep learning methods to cell image analysis is the lack of large size, annotated data for training the neural network models. However, humans are capable of using their vision system to recognize both the patterns from everyday natural images and the patterns from microscopic images. Therefore, at the very high level, the goal is to train the model with one type of image and teach the model to automatically learn data patterns that can be used for cell functionality recognition tasks.

In one embodiment, the deep neural network framework uses a two-step approach. In an example, images of the training input array 208 include live fluorescence microscopic images, multispectral bright-field absorption images, chemiluminescent images, radioactive images or hyperspectral fluorescent images that show RPEs with anti-ZO-1 antibody staining (white). A tight junction protein ZO-1 represents borders of the RPE cells. In other examples. Advantageously, based on an understanding of cell borders and visual parameters (i.e., shape, intensity and texture metrics) within the microscopic images, the deep neural network model 212 is capable of detecting cell borders and correlation of visual parameters within such images of the new input array 210 (e.g., the live fluorescence microscopic images, multispectral absorption bright-field images, chemiluminescent images, radioactive images or hyperspectral fluorescent images of similar cells or cell derived products). It should be noted that texture metrics may include a plurality of sub-cellular features. It should be further noted that the multispectral bright-field absorption images may include images with phase contrast, differential interference contrast or any other images having bright-field modality.

Embodiments of the present disclosure utilize a concept known as transfer learning in machine learning community. In other words, the disclosed methods utilize effective automatic retention and transfer of knowledge from one task (microscopic images) to another related task (live absorbance image analysis).

Figure 3A:
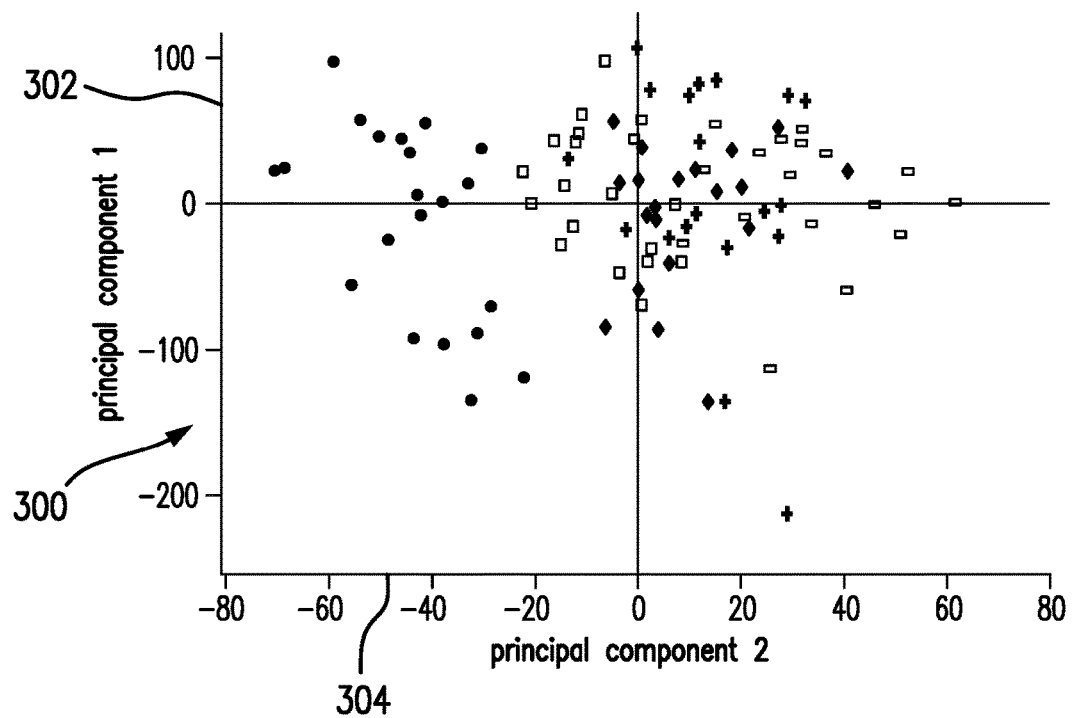
FIGS. 3A-3C illustrate transformation from multi-dimensional data to lower-dimensional data using a principal component analysis machine learning model, according to an embodiment of the present disclosure.
Figure 3B:
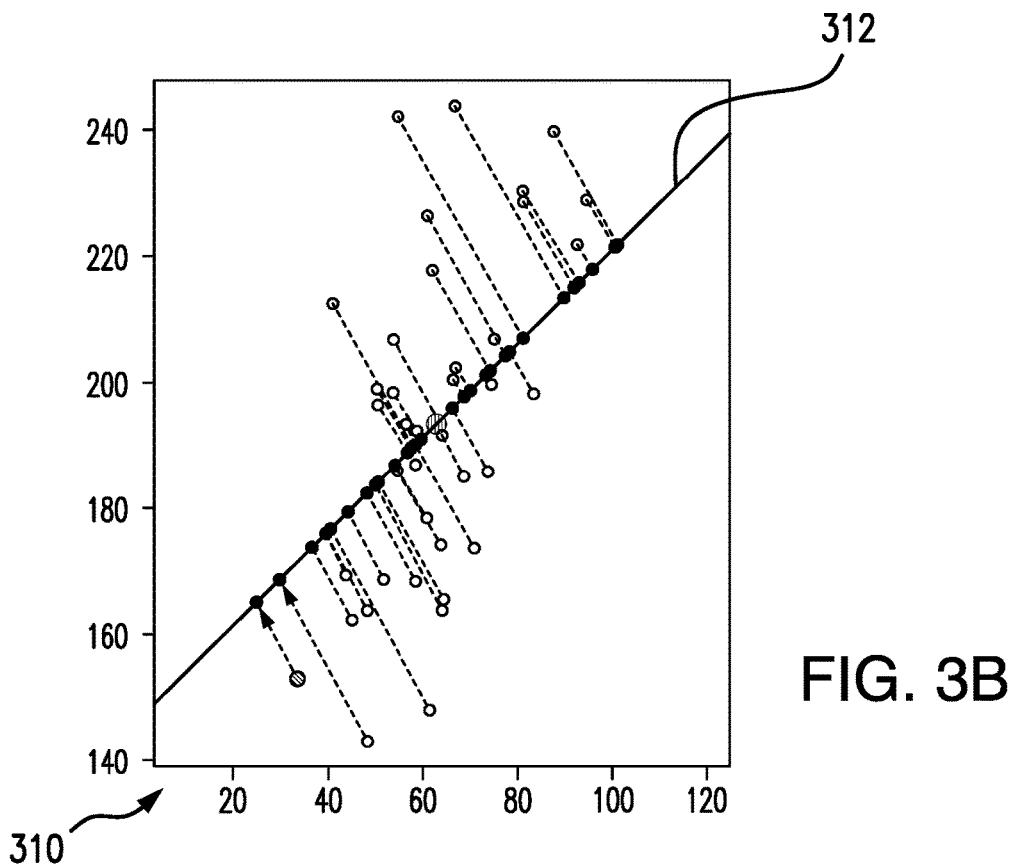
Figure 3C:
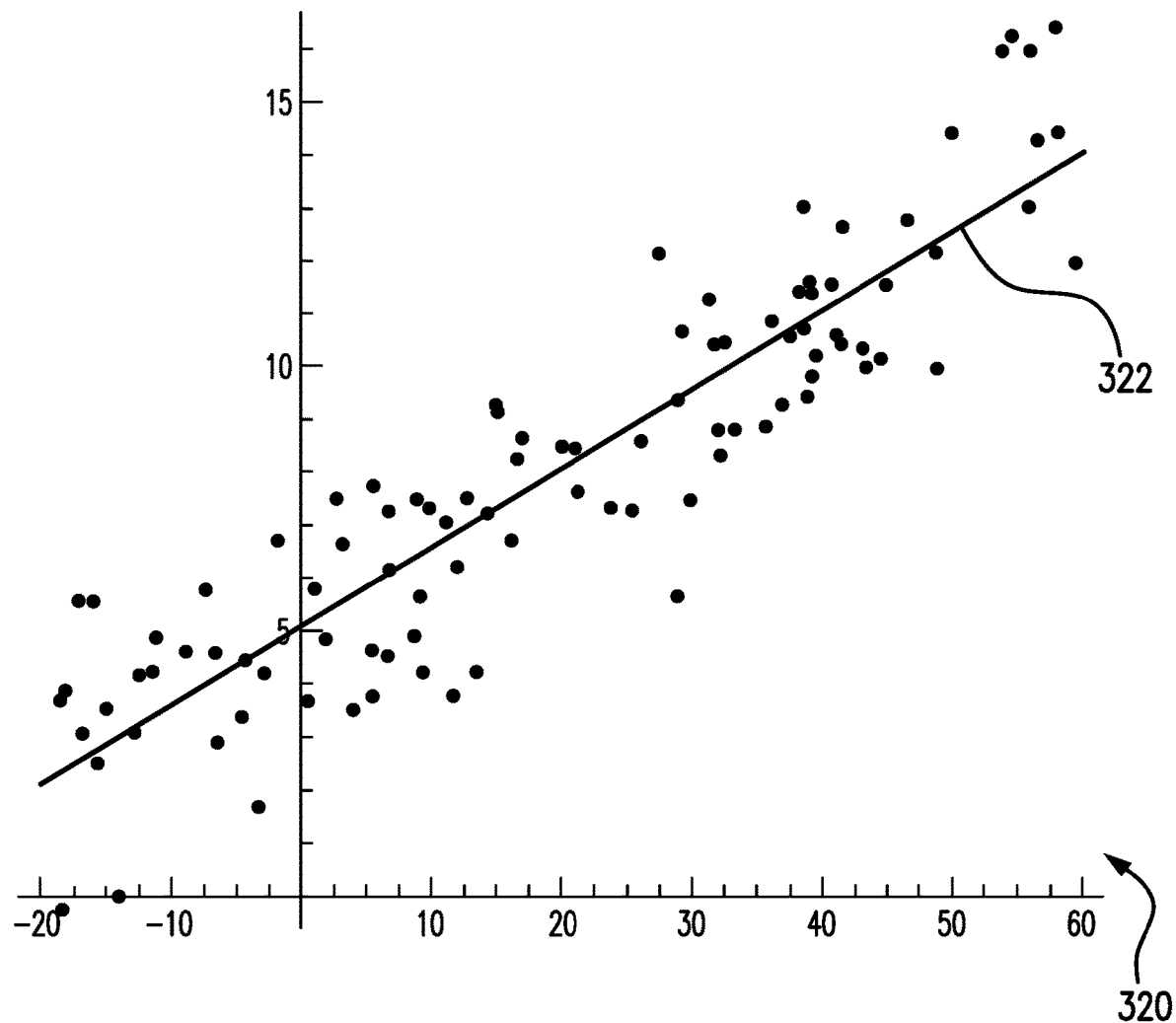

As noted above, in various embodiments the machine learning predictive model 204 may include multiple types of predictive models. In one embodiment, the machine learning predictive model 204 may employ dimension and/or rank reduction. FIGS. 3A-3C illustrate transformation from multi-dimensional data to lower-dimensional data using a principal component analysis machine learning model, according to an embodiment of the present disclosure.

In using factor analysis as a variable reduction technique, the correlation between two or more variables may be summarized by combining two variables into a single factor. For example, two variables may be plotted in a scatterplot. A regression line may be fitted (e.g., by machine learning predictive model 204 of FIG. 2A) that represents a summary of the linear relationships between the two variables. For example, if there are two variables, a two-dimensional plot may be performed, where the two variables define a line. With three variables, a three-dimensional scatterplot may be determined, and a plane could be fitted through the data. With more than three variables it becomes difficult to illustrate the points in a scatterplot, but the analysis may be performed by machine learning predictive model 204 to determine a regression summary of the relationships between the three or more variables. A variable may be defined that approximates the regression line in such a plot to capture principal components of the two or more items. Data measurements from stem cell data or stem cell derived cell type data on the new factor (i.e., represented by the regression line) may be used in future data analyses to represent that essence of the two or more items. Accordingly, two or more variables may be reduced to one factor, wherein the factor is a linear combination of the two or more variables.

The extraction of principal components (e.g., first component 302 and second component 304 in FIG. 3A) may be found by determining a variance maximizing rotation of the original variable space. For example, in a scatterplot 310 shown in FIG. 3B, a regression line 312 may be the original X-axis in FIG. 3A, rotated so that it approximates the regression line. This type of rotation is called variance maximizing because the criterion for (i.e., goal of) the rotation is to maximize the variance (i.e., variability) of the "new" variable (factor), while minimizing the variance around the new variable. Although it is difficult to perform a scatterplot with three or more variables, the logic of rotating the axes so as to maximize the variance of the new factor remains the same. In other words, the machine learning predictive model 204 continues to plot next best fit line 312 based on the multi-dimensional data 300 shown in FIG. 3A. FIG. 3C shows a final best fit line 322 where all variance of data is accounted for by the machine learning predictive model 204.

Figure 4:
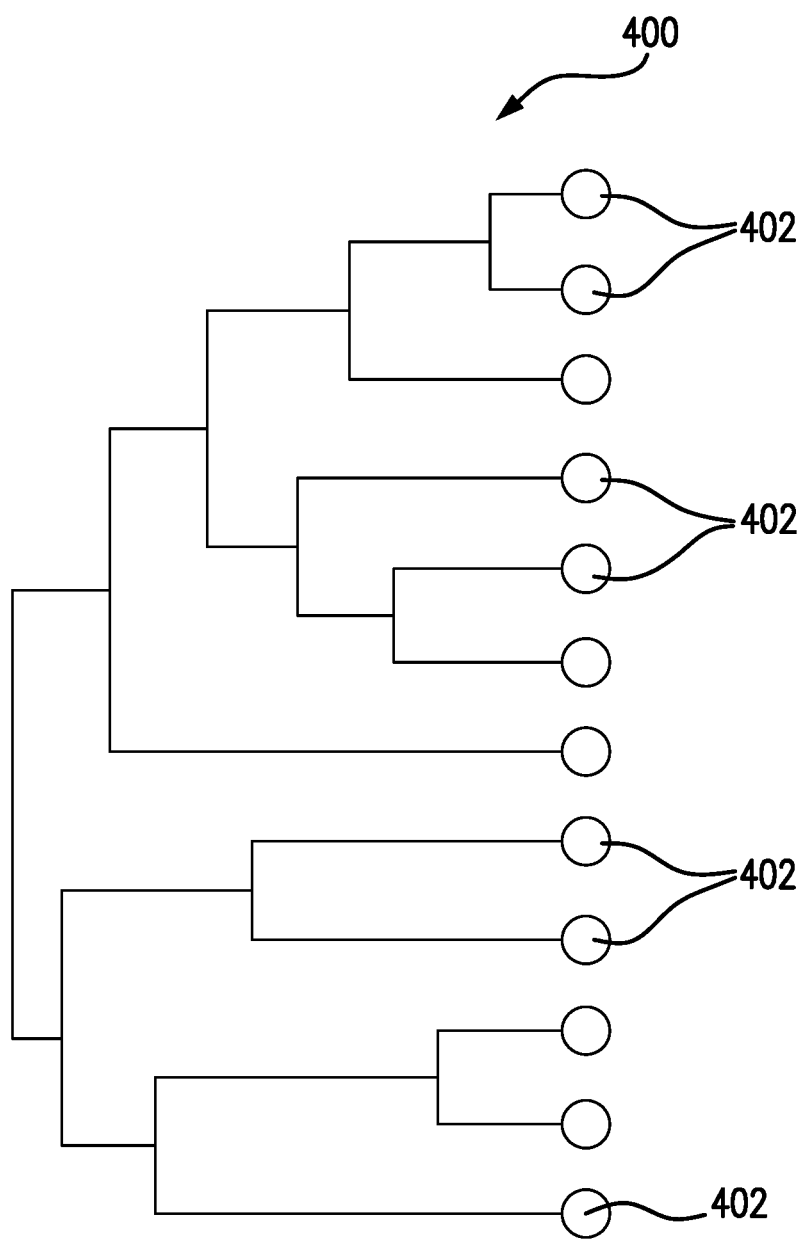
FIG. 4 shows an example method of hierarchical clustering for identifying similar groups, according to an embodiment of the present disclosure.

According to another embodiment, the machine learning predictive model 204 may employ a clustering approach. FIG. 4 shows an example method of hierarchical clustering for identifying similar groups, according to an embodiment of the present disclosure. The clustering approach involves cluster analysis. In the context of this disclosure, the term "cluster analysis" encompasses a number of different standard algorithms and methods for grouping objects of similar kind into respective categories to thus organize observed data into meaningful structures. In this context, cluster analysis is a common data analysis process for sorting different objects into groups in a way that the degree of association between two objects is maximal if they belong to the same group and minimal otherwise. Cluster analysis can be used to discover organization within data without necessarily providing an explanation for the groupings. In other words, cluster analysis may be used to discover logical groupings within data.

In an alternative embodiment, the clustering approach may involve hierarchical clustering. The term "hierarchical clustering" encompasses joining together measured outcomes into successively less similar groups (clusters). In other words, hierarchical clustering uses some measure of similarity/distance.

FIG. 4 illustrates an example of hierarchical clusters 402. Clustering can be used to identify cell therapy product safety by identifying which cell line had developed mutations in oncogenes. In this case, hierarchical bootstrap clustering can be performed on a dataset of cell features derived from the segmentation of RPE images via a convolutional neural network. Cell lines that had developed cancerous mutations are statistically different from all other non-mutated lines (see, for example, FIG. 13). In various embodiments the clustering approach discussed above can be used for identifying how similar groups of treatments, genes, etc. are related to one another.

Figure 5:
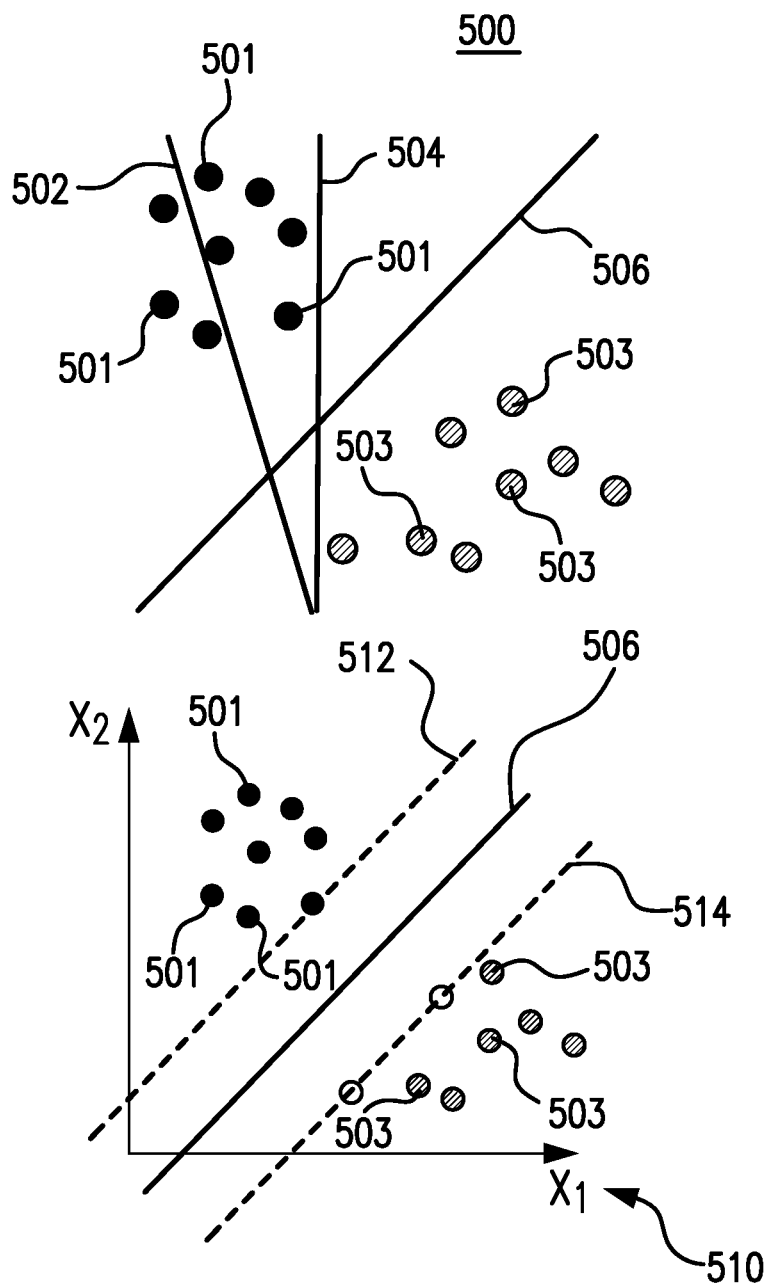
FIG. 5 shows one example of a vector based regression model that could be utilized by the selected machine learning framework, according to an embodiment of the present disclosure.

According to yet another embodiment, the machine learning predictive model 204 may employ vector based regression. Reference is now made to FIG. 5, which shows one example of a vector based regression model that could be utilized by the machine learning predictive model 204, according to an embodiment of the present disclosure. More specifically, FIG. 5 shows a two-dimensional data space 500. It will be appreciated that the data space may be of n-dimensions in other embodiments and that a hyperplane in an n-dimensional space is a plane of n−1 dimensions (e.g., in a three-dimensional space, the hyperplane is a two-dimensional plane). In the case of a two-dimensional data space, hyperplanes are one-dimensional lines in the data space.

The data space 500 has example measurement samples 501, 503. The training samples include samples of one class, here termed "first clone" samples 501, and samples of another class, here termed "second clone" samples 503. Three candidate hyperplanes are shown, labelled 502, 504, and 506. It will be noted that first hyperplane 502 does not separate the two classes; second hyperplane 504 does separate the two classes; but with relatively smaller margins than the third hyperplane 506; and the third hyperplane 506 separates the two classes with the maximum margin. Accordingly, the machine learning predictive model 204 will output 506 as the classification hyperplane, i.e., the hyperplane used to classify new samples as either first clone or second clone.

Measurements identified as outliers can be utilized in regression analyses to analyze specific parameters, relationships between parameters, and the like. Dimensions are defined as a set of samples whose dot product with the vector is always constant. Vectors are typically chosen to maximize the distance between samples. In other words, candidate vectors are penalized for their proximity to the collected data set. In various embodiments, this penalization, as well as the distance at which such penalization occurs, may be configurable parameters of the machine learning predictive model 204.

The bottom section of FIG. 5 illustrates the hyperplane 506 with respect to other parallel hyperplanes 512 and 514. The hyperplanes 512 and 514 separate the two classes of data, so that the distance between them is as large as possible. The third hyperplane 506 lies halfway between the hyperplanes 512 and 514.

The predictive models shown in FIGS. 3-5 are only examples of suitable machine learning methods that may be employed by the machine learning predictive model 204 and are not intended to limit the scope of use or functionality of embodiments of the present disclosure described above. It should be noted that other machine learning methods that may be utilized by the machine learning predictive model 204 include, but are not limited to, partial least squares regression, local partial least squares regression, orthogonal projections to latent structures, three pass regression filters, decision trees with recursive feature elimination, Bayesian linear and logistic models, Bayseian ridge regression, and the like.

Figure 6:
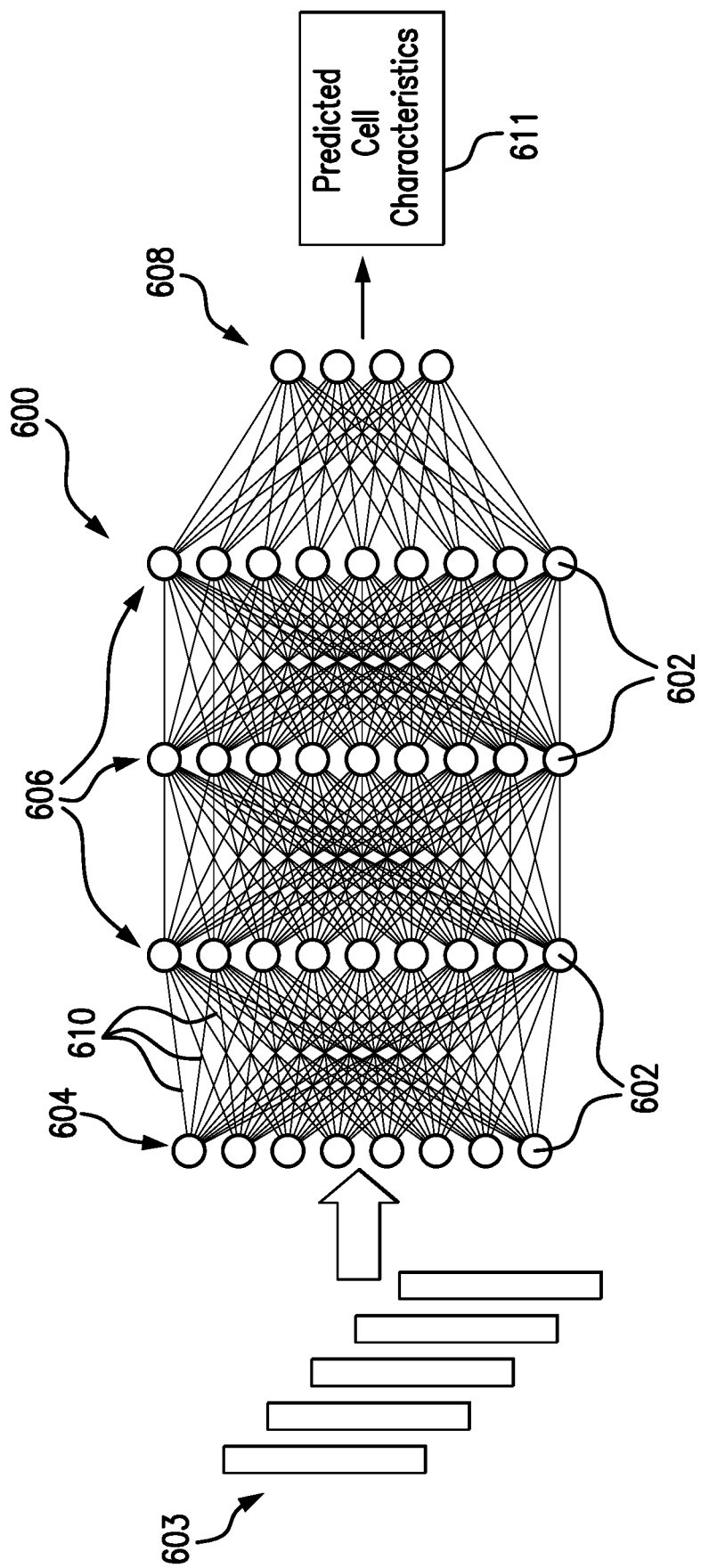
FIG. 6 is a schematic illustrating one embodiment of a deep neural network, in accordance with an embodiment of the present disclosure.

FIG. 6 illustrates an exemplary fully-connected deep neural network (DNN) 600 that can be implemented by the deep neural network model 212 in accordance with embodiments of the present disclosure. The DNN 600 includes a plurality of nodes 602, organized into an input layer 604, a plurality of hidden layers 606, and an output layer 608. Each of the layers 604, 606, 608 is connected by node outputs 610. It will be understood that the number of nodes 602 shown in each layer is meant to be exemplary, and are in no way meant to be limiting. Additionally, although the illustrated DNN 600 is shown as fully-connected, the DNN 600 could have other configurations.

As an overview of the DNN 600, the images to be analyzed 603 can be inputted into the nodes 602 of the input layer 604. Each of the nodes 602 may correspond to a mathematical function having adjustable parameters. All of the nodes 602 may be the same scalar function, differing only according to possibly different parameter values, for example. Alternatively, the various nodes 602 could be different scalar functions depending on layer location, input parameters, or other discriminatory features. By way of example, the mathematical functions could take the form of sigmoid functions. It will be understood that other functional forms could additionally or alternatively be used. Each of the mathematical functions may be configured to receive an input or multiple inputs, and, from the input or multiple inputs, calculate or compute a scalar output. Taking the example of a sigmoid function, each node 602 can compute a sigmoidal nonlinearity of a weighted sum of its inputs.

As such, the nodes 602 in the input layer 604 receive the microscopic images of cells 603 and then produce the node outputs 610, which are sequentially delivered through the hidden layers 606, with the node outputs 610 of the input layer 604 being directed into the nodes 602 of the first hidden layer 606, the node outputs 610 of the first hidden layer 606 being directed into the nodes 602 of the second hidden layer 606, and so on. Finally, the nodes 602 of the final hidden layer 606 can be delivered to the output layer 608, which can subsequently output the prediction 611 for the particular cell characteristic(s), such as TER, or cell identity for example.

Prior to run-time usage of the DNN 600, the DNN 600 can be trained with labeled or transcribed data. For example, during training, the DNN 600 is trained using a set of labeled/defined images of the training input array 208. As illustrated, the DNN 600 is considered "fully-connected" because the node output 610 of each node 602 of the input layer 604 and the hidden layers 606 is connected to the input of every node 602 in either the next hidden layer 606 or the output layer 608. As such, each node 602 receives its input values from a preceding layer 604, 606, except for the nodes 602 in the input layer 604 that receive the input data 603. Embodiments of the present disclosure are not limited to feed forward networks but contemplate utilization of recursive neural networks as well, in which at least some layers feed data back to earlier layers.

Figure 7:
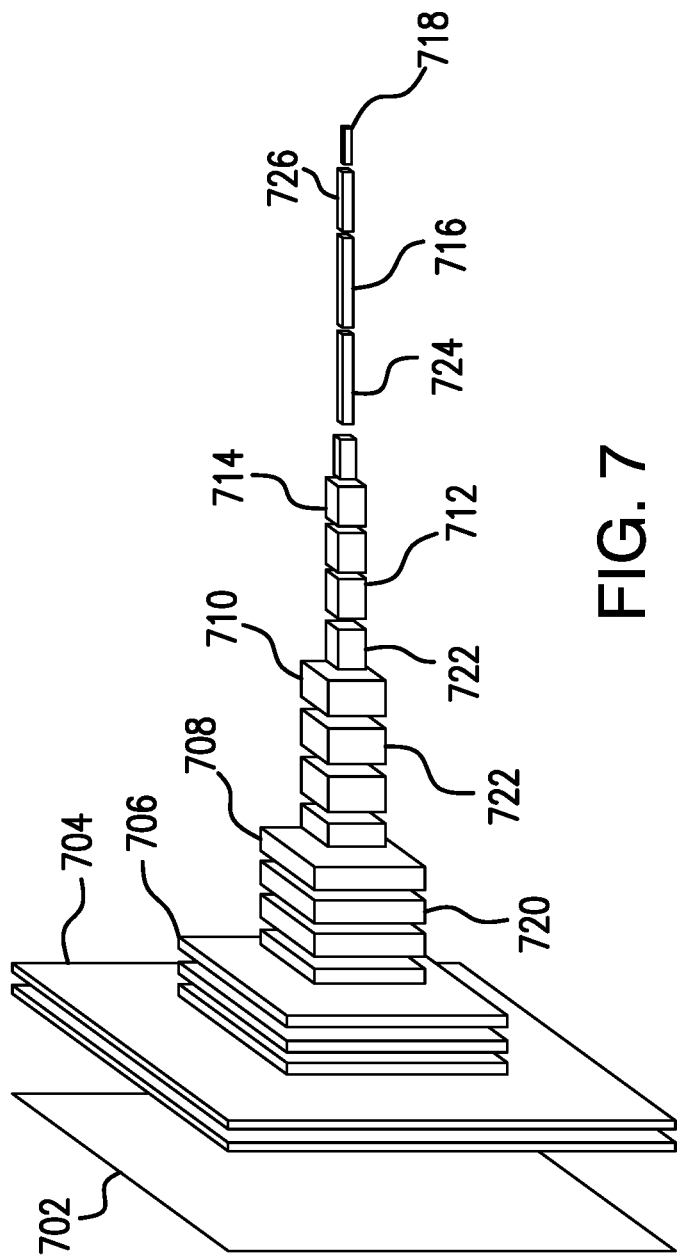
FIG. 7 is a schematic diagram of exemplary convolutional neural network (CNN) model architecture, according to an embodiment of the present disclosure.

At least in one embodiment, the deep neural network model 212 may employ a convolutional neural network. FIG. 7 is a schematic diagram of exemplary convolutional neural network model architecture, according to an embodiment of the present disclosure. The architecture in FIG. 7 shows a plurality of feature maps, also known as activation maps. In one illustrative example, if the object image 702 to be classified (e.g., one of the images of the new input array 210) is a JPEG image having size of 224×224, the representative array of that image will be 224×224×3 (wherein the "3" refers to RGB values). The corresponding feature maps 704-718 can be represented by the following arrays 224×224×64, 112×112×128, 56×56×256, 28×28×512, 14×14×512, 7×7×512, 1×1×4096, 1×1×1000, respectively.

Moreover, as noted above, the convolutional neural network includes multiple layers, one of which is a convolution layer that performs a convolution. Each of the convolutional layers acts as a filter to filter the input data. At a high level, CNN takes the image 702, and passes it through a series of convolutional, nonlinear, pooling (downsampling), and fully connected layers to get an output. The output can be a single class or a probability of classes that best describes the image.

The convolution includes generation of an inner product based on the filter and the input data. After each convolution layer, it is a conventional technique to apply a nonlinear layer (or activation layer) immediately afterward such as ReLU (Rectified Linear Units) layer. The purpose of the nonlinear layer is to introduce nonlinearity into a system that basically has just been computing linear operations (e.g., element-wise multiplications and summations) during operations by the convolution layers. After some ReLU layers, CNNs may have one or more pooling layers. The pooling layers are also referred to as downsampling layers. In this category, there are also several layer options, e.g., maxpooling. This maxpooling layer basically takes a filter (normally of size 2×2) and a stride of the same length, which the maxpooling layer applies to the input volume and outputs a maximum number in every sub-region around which the filter convolves.

Each fully connected layer receives the input volume (e.g., the output is of the convolution, ReLU or pooling layer preceding it) and outputs an N dimensional vector, where N is the number of classes that the learning model has to choose from. Each number in this N dimensional vector represents the probability of a certain class. The fully connected layer processes the output of the previous layer (which represents the activation maps of high level features) and determines which features most correlate to a particular class. For example, a particular output feature from a previous convolution layer may indicate whether a specific feature in the image is indicative of an RPE cell, and such feature can be used to classify a target image as 'RPE cell' or 'non-RPE cell'.

Furthermore, the exemplary CNN architecture can have a softmax layer along with a final fully connected layer to explicitly model bipartite-graph labels (BGLs), which can be used to optimize the CNN with global back-propagation.

More specifically, the exemplary architecture of the CNN network shown in FIG. 7 includes a plurality of convolution and ReLU layers 720, max pooling layers 722, fully connected and ReLU layers 724 and the softmax layer 726. In one embodiment, the CNN network 700 may include 139 layers and forty two (42) million parameters.

Figure 8:
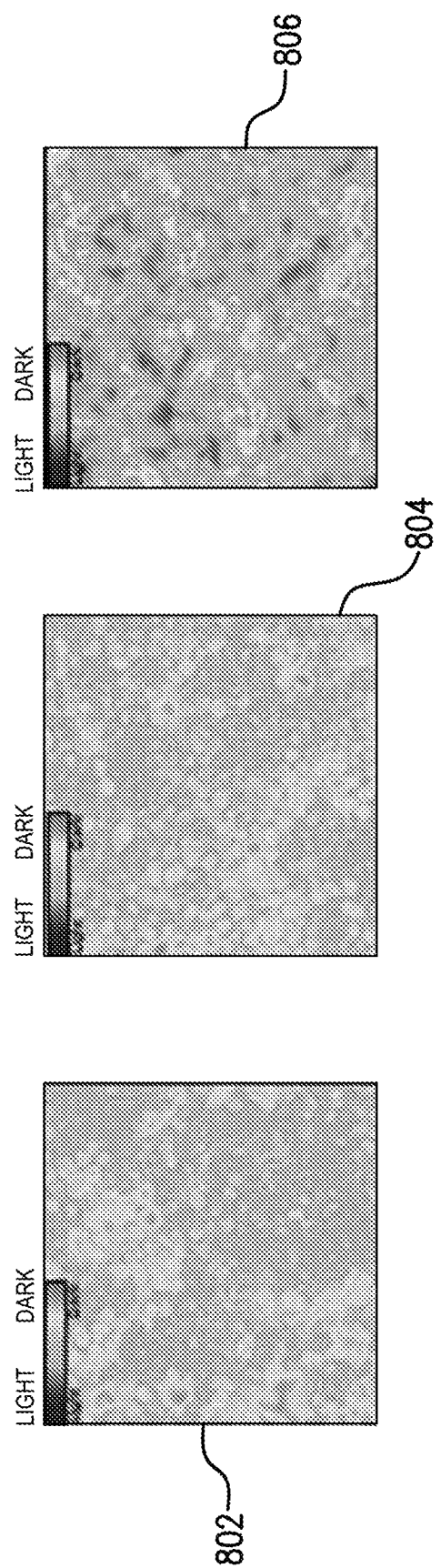
FIG. 8 illustrates stem cell images that may be used by the selected machine learning framework and/or deep neural network framework to determine stem cell function, according to an embodiment of the present disclosure.

FIG. 8 illustrates stem cell images that may be used by the traditional machine learning framework and/or deep neural network framework to determine stem cell function, according to an embodiment of the present disclosure. In this embodiment, two different cell lines of iPSC-RPE cells are seeded per well into 12-well dishes. It should be noted that the RPE cells, essential for photoreceptor development and function, require a functional primary cilium for complete maturation. One set of cells is left untreated, while two other sets are manipulated during the maturation stage of iPSC-RPE differentiation. Another set of cells is treated, after 10 days in culture, with aphidocolin, a tetracyclic antibiotic that increases ciliogenesis by blocking G1-to-S transition in cells and that promotes RPE differentiation.

Another set of the seeded cells is treated with HPI-4, an AAA+ATPase dynein motor inhibitor that works by blocking ciliary protein transport to inhibit function of the cilium, thusly inhibiting RPE differentiation and providing a good negative control. According to an embodiment of the present disclosure, measurements are taken at 6 different time points (e.g. weeks 2 through 7) during the maturation stage of iPSC-RPE differentiation. Such measurements include but are not limited to TER, cytokine secretion profiles, and phagocytic capability. It should be noted that one of the most important functions of RPE cells is phagocytosis of photoreceptors to shed outer segments. FIG. 8 illustrates an aphidicolin treated RPE cell 802, untreated RPE cell 804 (control group) and the HPI-4 treated RPE cell 806. The plurality of images 802-806 are used as the images of the new input array 210 to be analyzed. The CNN network 700 is configured to predict TER measurements for the plurality of images. In one embodiment, the plurality of input images may include approximately 15,000 images.

Figure 9:
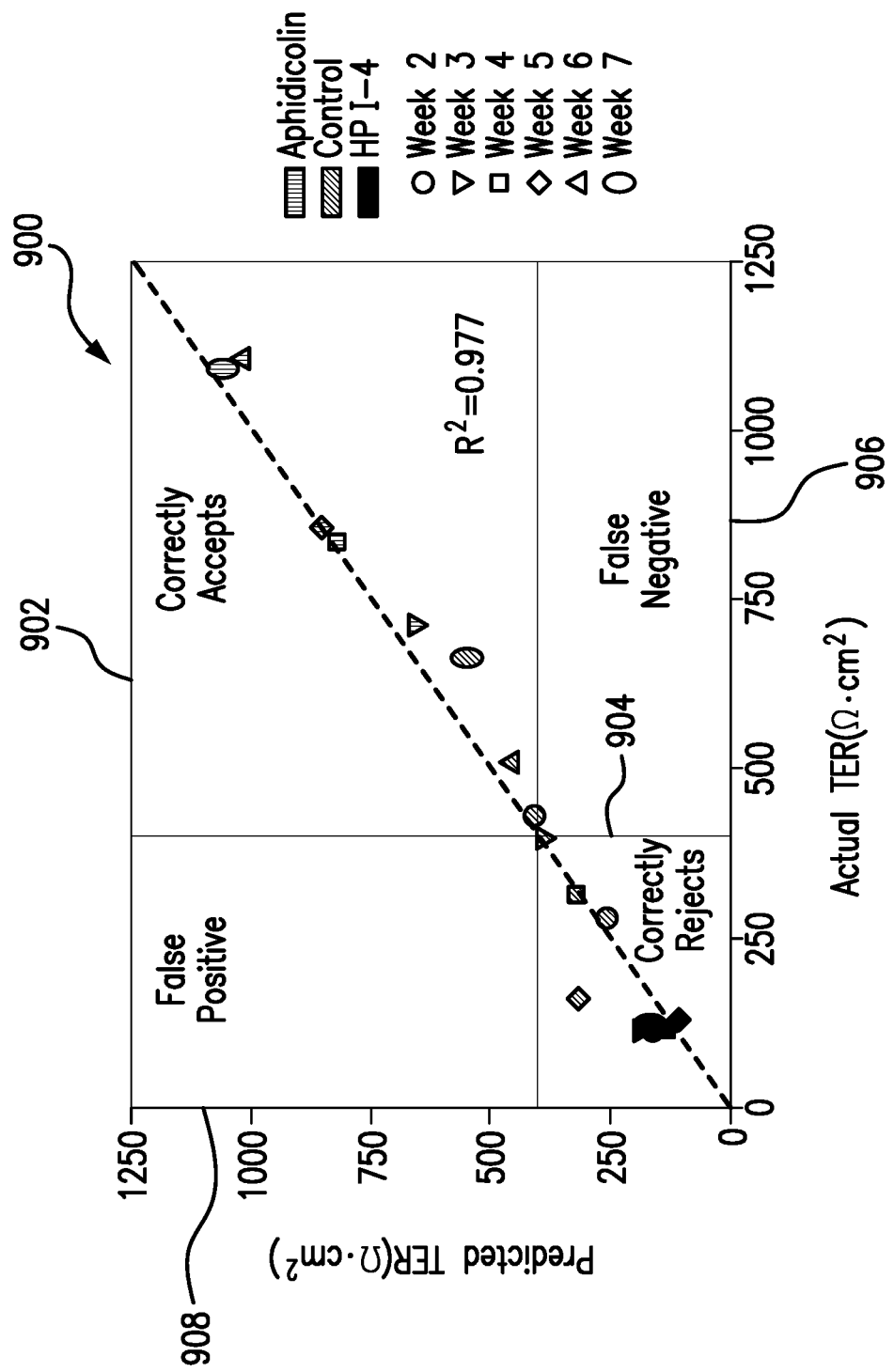
FIG. 9 illustrates average cellular resistance (TER) prediction results provided by the CNN model, according to an embodiment of the present disclosure.

FIG. 9 illustrates TER prediction results 900 provided by the CNN model, according to an embodiment of the present disclosure. In FIG. 9, the horizontal axis 906 represents actual TER measurements, while the vertical axis 908 represents TER values predicted by the CNN network 700. The results are shown for all three sets of grown RPE cells and for all measurements taken at different time points. In this embodiment, the release criteria is set at TER of 400 Ohm*Cm$^2$. In FIG. 9, region 902 contains all correctly accepted cells, while region 904 represents all cells correctly rejected by the CNN model 700. In other words, in this case the CNN model 700 is a perfect predictor that is capable of predicting the average cellular resistance (TER) with a 100% sensitivity and 100% specificity.

Figure 10:
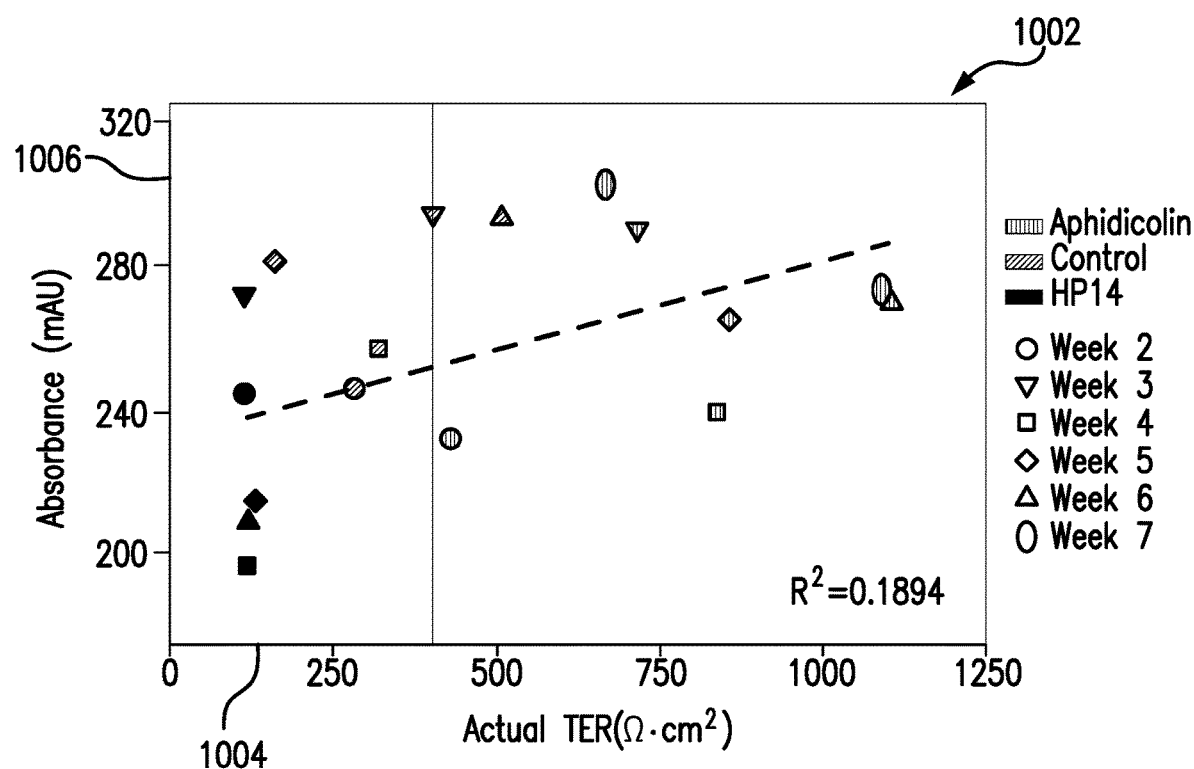
FIG. 10 illustrates that there is no direct correlation between bulk absorbance measurement and TER.

FIG. 10 illustrates that there is no direct correlation between bulk absorbance measurement and TER. More specifically, FIG. 10 depicts a plot 1002 of absorbance vs. TER. In FIG. 10, the horizontal axis 1004 represents actual TER measurements, while the vertical axis 1006 represents absorbance values. The plot 1002 clearly illustrates that there is no direct correlation between bulk absorbance measurements and TER measurements. Therefore, a plurality of visual parameters (e.g. spatial, textural and geometric data) utilized by the CNN model 700 is necessary for predictive capability.

Figure 11:
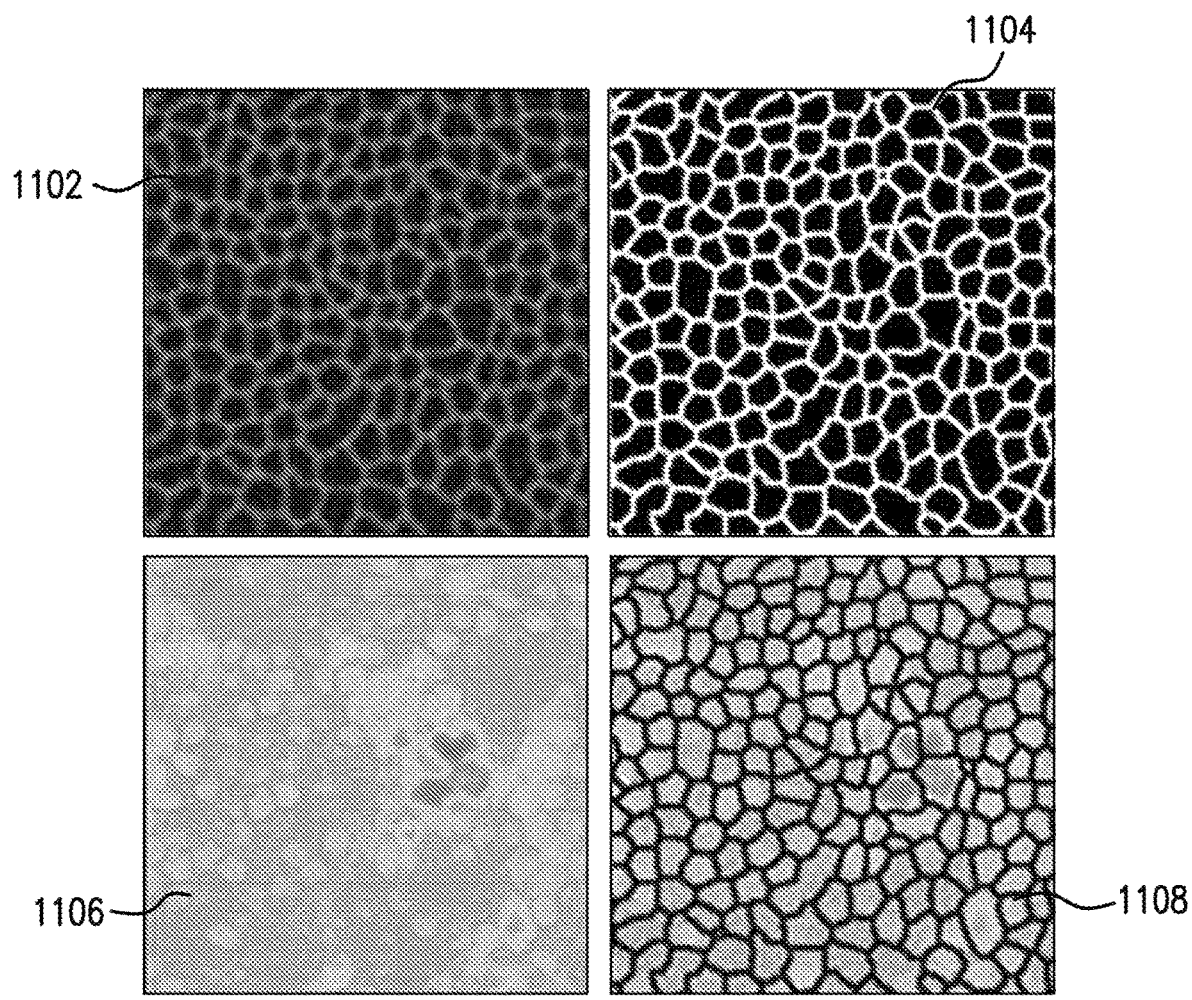
FIG. 11 illustrates segmentation based on a similarity approach utilized by the CNN model, according to an embodiment of the present disclosure.

FIG. 11 illustrates segmentation based on a similarity approach utilized by the CNN model, according to an embodiment of the present disclosure. In FIG. 11, the first image 1102 represents an image of the training input array 208 including confocal fluorescence microscopic images that show RPEs with anti-ZO-1 antibody staining (white). The tight junction protein ZO-1 represents the borders of the RPE cells. The second image 1104 represents the first image 1102 segmented by the CNN model 700. Furthermore, in this embodiment, the images of the new input array 210 to be analyzed includes live multispectral absorption images represented in FIG. 11 by the third image 1106. The fourth image 1108 represents the third image 1106 segmented by the deep neural network model 212. It should be noted that while the second image 1104 can be validated by hand correction of cell borders clearly visible in the first image 1102, hand correction is much more difficult, if not impossible, with respect to the fourth image 1108. Advantageously, based on an understanding of cell borders and visual parameters (e.g., shape, intensity and texture metrics) the deep neural network model 212 is capable of detecting cell borders and performing correlation of visual parameters within similar multispectral absorption images of the new input array 210.

Figure 12:
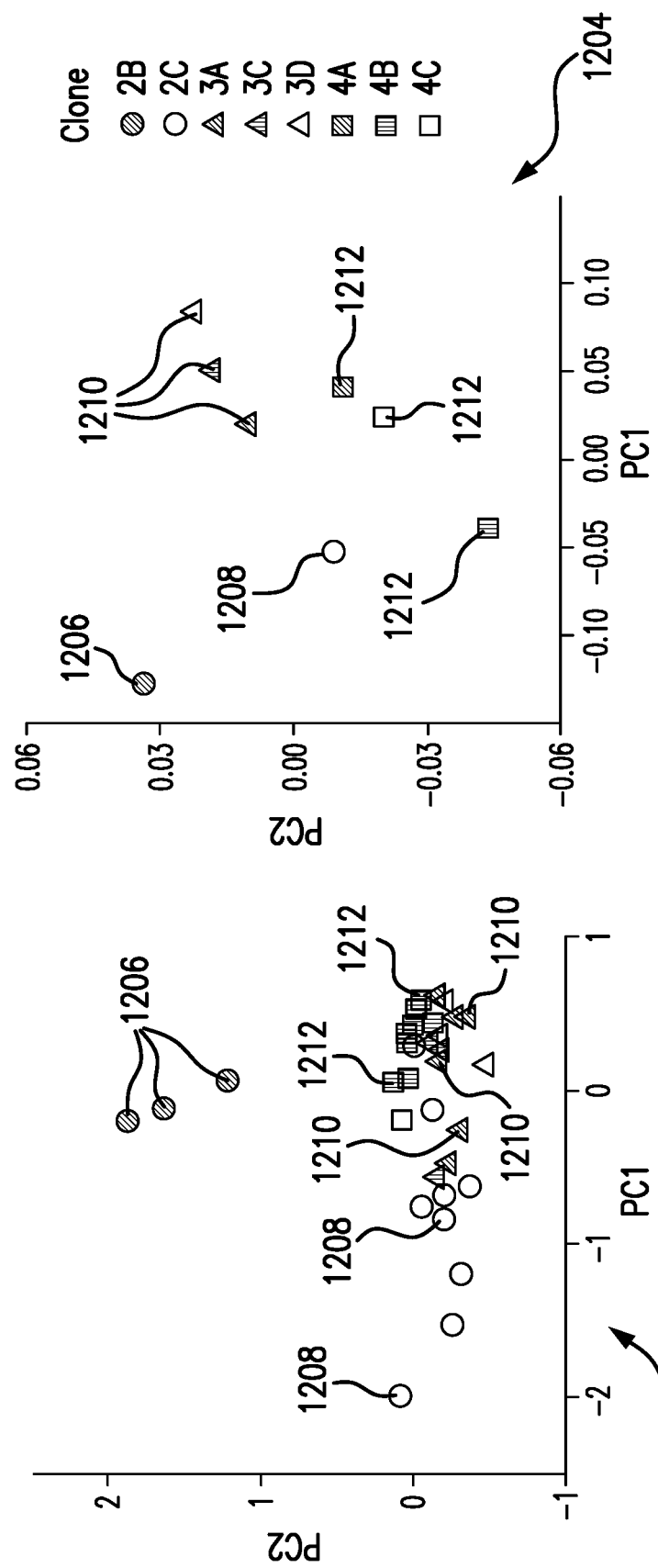
FIG. 12 illustrates a comparison of a principal component analysis performed with and without visual data, according to an embodiment of the present disclosure.

FIG. 12 illustrates a comparison of the principal component analysis performed only with molecular and physiological data and image analysis performed with only visual data, according to an embodiment of the present disclosure. Each shape-shade combination in FIG. 12 shows a different clone produced from one of three donors (here termed "Donor 2", "Donor 3" and "Donor 4"). PCA dimension reduction is performed here to more easily visualize clone groupings across 24 different selected metrics and across 27 different shape metrics utilized by the machine learning predictive model 204. FIG. 12 illustrates a comparison between the plot 1202 of PCA performed on image analysis using selected metrics (such as TER, gene expression, release of growth factors, phagocytosis of photoreceptor outer segments, and the like) and the plot 1204 of PCA performed on image analysis using the machine learning predictive model 204. Identical trends of separation between donors and clones can be seen between the two plots 1202 and 1204. First clones 1206 of donor 2 are clearly separated the farthest from the other clones, followed by the second clones 1208 of the same donor. Furthermore, clones 1210 of the donor 3 and clones 1212 of the donor 4 have tighter associations with each other than with clones 1206 and 1208 of the other donor.

Figure 13:
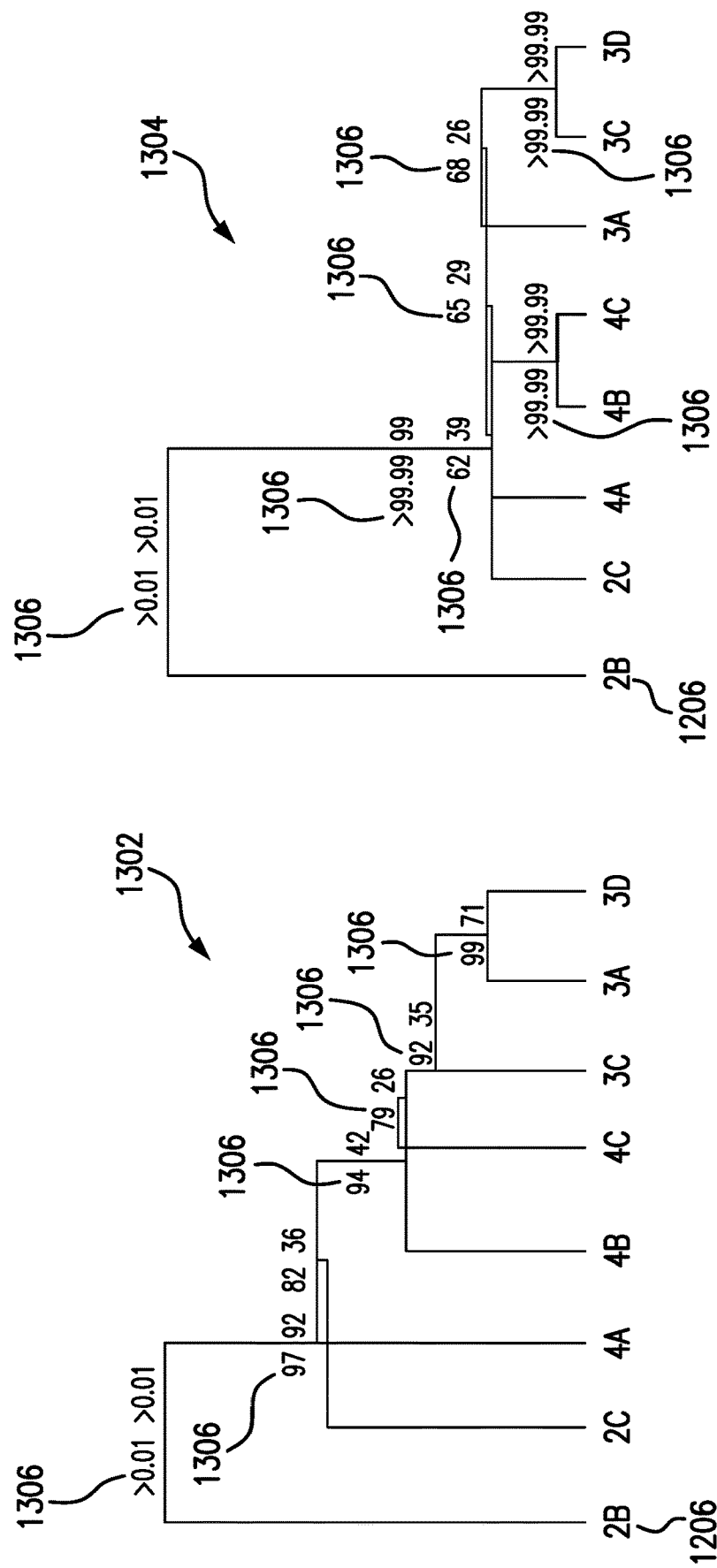
FIG. 13 illustrates comparison of a hierarchical clustering method performed with and without visual data, according to an embodiment of the present disclosure.

This trend is consistent across various machine learning techniques utilized by the machine learning predictive model 204, as shown in FIG. 13. FIG. 13 illustrates comparison of the hierarchical clustering method performed with and without visual data, according to an embodiment of the present disclosure. In FIG. 13, a first hierarchical clustering map 1302 represents analysis of measurements using selected metrics (without visual image data) discussed above, while a second hierarchical map 1304 represents visual image analysis performed by the machine learning predictive model 204. According to an illustrated embodiment, the first 1302 and second 1304 hierarchical clustering maps are generated by applying multiscale bootstrap resampling to the hierarchical clustering of the analyzed data. It should be noted that all numbers labeled by reference numeral 1306 represent the corrected probability of clustering, while the remaining numbers represent the uncorrected probability.

FIG. 13 illustrates that the analysis performed by the machine learning predictive model 204 not only agrees with the analysis performed using selected metrics, but the analysis performed by the machine learning predictive model 204 also provides valuable insight into the biology underlying what could be causing this grouping. The second hierarchical clustering map 1304 is in agreement with the sequence analysis of iPSC-RPE cells for oncogenes (illustrated in FIG. 14) which indicated that the first clone 1206 of donor 2 had mutated several oncogenes during reprogramming.

Figure 14:
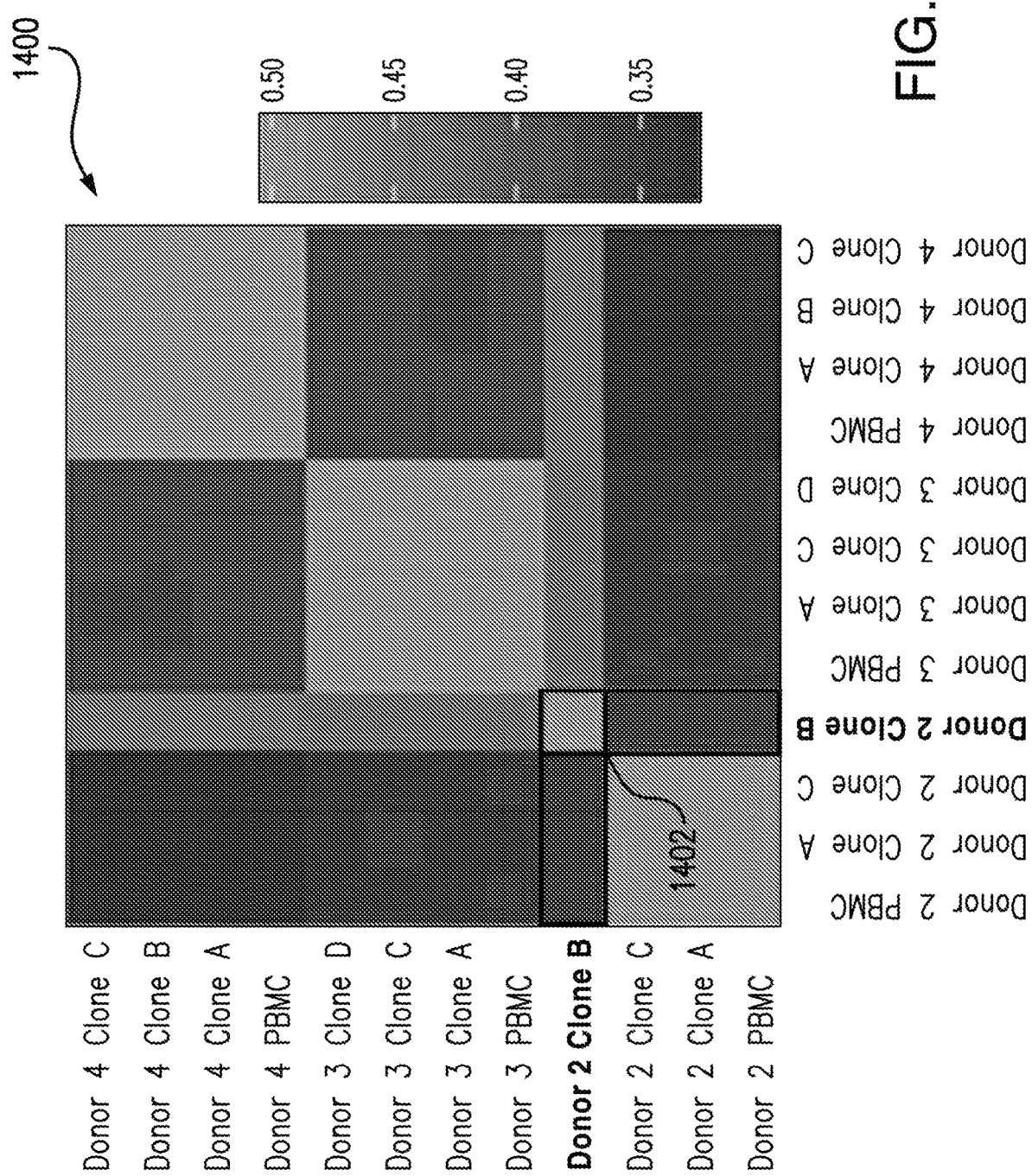
FIG. 14 depicts sequence analysis of induced pluripotent stem cells (iPSC)—retinal pigment epithelial (RPE) cells, according to an embodiment of the present disclosure.

FIG. 14 depicts sequence analysis of oncogenes of analyzed iPSC-RPE cells, according to an embodiment of the present disclosure. FIG. 14 illustrates that 9 clones from three different donors were tested. Only one clone 1206 of the tested clones showed mutations during reprogramming to iPSC, which is represented by the highlighted region 1402.

In embodiments, since certain software applications, such as MATLAB® or Fiji, can have limitations regarding the size of the input image they can handle, a large input image can be split into overlapping tiles. The tiles can be processed separately, such by performing segmentation using a deep neural network or performing particle analysis i on each tile separately. The image can then be reconstructed using an appropriate software application (e.g., C++) tiles can then be C++ reconstructs from the processed individual tiles. The reconstructed image can be free of any visual indication that tiles had been used.

In summary, various embodiments of the present disclosure are directed to a novel computational framework for generating lot and batch release criteria for a clinical preparation of individual stem cell lines to determine the degree of similarity to previous lots or batches. Advantageously, the novel computational framework can be used for any stem cell types (such, as, but not limited to, ESCs, iPSCs, MSCs, NCSs), for any derived stem cell product (e.g., iPSC RPE derived cells), or any given cell line or genetically modified cell therapy product (e.g., chimeric antigen receptor (CAR) T-cells) which can be imaged using bright-field multispectral imaging. The advantages provided by the deep neural network model 212 and the machine learning predictive/classifying model 204 contemplated by various embodiments of the present disclosure include the prediction ability of the models to automate culture conditions, such as, but not limited to, cell passage time, purity of iPSCs or other stem cell types in culture, identification of either healthy or unhealthy iPSC cell colonies, identification and potency of differentiated cells, identification and potency of drugs and toxins, and the like.

In other words, these techniques allow simple and efficient gathering of a wide spectrum of information, from screening new drugs, to studying the expression of novel genes, to creating new diagnostic products, and even to monitoring cancer patients. This technology permits the simultaneous analysis and isolation of specific cells. Used alone or in combination with modem molecular techniques, the technology provides a useful way to link the intricate mechanisms involving the living cell's overall activity with uniquely identifiable parameters. Furthermore, one of the key advantages provided by the disclosed computational frameworks is that the automated analysis performed by selected machine learning methods and modern deep neural networks substantially eliminates human bias and error.

Experimentation and Methods Used

A platform was developed that uses quantitative bright-field microscopy and neural networks to non-invasively predict tissue function. In experimentation, clinical-grade iPSC derived retinal pigment epithelium (iRPE) from age related macular degeneration (AMD) patients and healthy donors were used as a model system to determine if tissue function could be predicted from bright-field microscopy images.

The retinal pigment epithelium (RPE) is a cellular monolayer, and RPE are of clinical interest in research associated with use of RPE to treat AMD. Additionally, the appearance of RPE cells within the monolayer is known to be critical to RPE function and a recent clinical trial used visual inspection of RPE by an expert technician as a biomanufacturing release criterion for implantation. RPE cell appearance is largely dictated by the maturity of junctional complexes between neighboring RPE cells, and the characteristic pigmented appearance from melanin production. The junctional complex is linked to tissue maturity and functionality including barrier function (transepithelial resistance and potential (TER and TEP) measurements) and polarized secretion of growth factors (ELISA). Thus, cell appearance and function are correlated and may be predictive of each other.

The variability of transmitted light microscopy images makes them challenging to use for automated cell analysis and segmentation. Thus, the platform developed in this study consists of two components. The first is QBAM, using an automated method of capturing images that are reproducible across different microscopes. The second component is machine learning, which uses images generated by QBAM (QBAM images) to predict multicellular function. The machine learning techniques were split into the categories of deep neural networks (DNNs) and selected machine learning (SML). These techniques were chosen to provide speed, reproducibility, and accuracy in conjunction with non-invasive, automated methods for aiding in scaling the biomanufacturing process as cell therapies translate from the laboratory to the clinic.

System Overview and Test Case Description

QBAM was developed to achieve reproducibility in bright-field imaging across different microscopes. QBAM converts pixels from relative intensity units to absorbance units, wherein absorbance is an absolute measure of light attenuation). To improve reproducibility of imaging, QBAM calculates statistics on images in real time as they are captured to ensure the absorbance value measured at every pixel has a threshold confidence, which for this experiment was set to 95% confidence of 10 mill-absorbance units (mAU). In this study, three different band-pass filters were used for imaging, but the method scales to any number of wavelengths. QBAM imaging was implemented as a plugin for Micromanager (for microscopes with available hardware) or a modular python package (for microscopes not supported by Micromanager), which is configured so that a user can obtain QBAM images with only a few operations of a button.

Analysis of QBAM images was selectively performed at the field of view (FOV) scale or the single cell scale. A DNN was used for each of these scales, but for different purposes. The DNNs at the FOV scale were designed to directly predict two things: the outcome of functional/maturity assays (via DNN-F) or whether two sets of QBAM images came from the same donor (via DNN-I). No image processing was performed prior to feeding images into DNN-F or DNN-I.

Single cell analysis began with a DNN that identified cell borders in QBAM images (via DNN-S). Next, visual features of individual cells were extracted from the QBAM images using the web image processing pipeline (WIPP, wherein features that can be extracted are shown in in Table 4 below). The extracted visual features were then used to train SML algorithms to predict a variety of tissue characteristics, including function, identity of the donor the cells came from, and developmental outliers (having abnormal cell appearance). SML algorithms were then used to identify critical cell features that contributed to the prediction of tissue characteristics. To demonstrate the effectiveness of the imaging and analysis method, a proof of principle study was carried out on iRPE from the following donor types: healthy, oculocutaneous albinism disorder (OCA), and age-related macular degeneration (AMD). The iRPE from healthy donors were imaged as they matured, while AMD and OCA donors were imaged at a terminal timepoint once they had reached maturity.

iRPE from five different OCA patients and two healthy donors were imaged using QBAM to determine the sensitivity of the imaging method to biological variation and naturally low levels of melanin in OCA iRPE. In addition to weekly imaging, iRPE from healthy donors were assessed for the trans-epithelial resistance (TER) and polarized vascular endothelial growth factor (VEGF) secretion. TER is a measure of RPE maturity that increases as tight junctions form between neighboring cells. Polarized VEGF secretion is a measure of RPE function, where more VEGF is secreted on the basal side relative to the apical side of the cell monolayer (VEGF-Ratio). Finally, eight iRPE clones were derived from three AMD donors using clinical grade protocols. Here, clinical grade refers to production of cells using xenogeneic free reagents and cGMP compliant production processes. QBAM imaging was carried out on AMD iRPE once they had reached maturity.

Accuracy, Reproducibility, and Sensitivity of QBAM

QBAM imaging was validated with a combination of reference neutral density (ND) filters and biological samples. ND filters with known absorbance values were used as a reference to validate QBAM imaging by comparing absorbance measured on a UV-Vis spectrometer to absorbance measured using QBAM imaging. Absorbance measured with QBAM imaging strongly correlated with absorbance measured by the spectrometer across the visible spectrum. To further validate the method, reproducibility of QBAM of ND filters was determined across three additional microscopes, each equipped with different filters, objectives, and light sources. The root mean squared error (RMSE) across all filters and microscopes was 66 milli-absorbance units (mAU), or ≈4.4% at the highest absorbance value measured.

QBAM imaging was then tested on live, progressively maturing iRPE derived from two different healthy donors. A general trend of increasing mean absorbance as time progressed was found. To determine how sensitive QBAM imaging was with respect to iRPE pigmentation, QBAM was used to image iRPE from five different patients with OCA (a disease known to reduce iRPE pigmentation). OCA iRPE were sequenced to confirm the albinism type (OCA1A or OCA2) and the disease severity. OCA1A iRPE have severe albinism and produce no melanin (OCA8 and OCA26) and thus had the lowest image absorbance. OCA2 patients had a range of phenotypes from moderate (OCA103 and OCA9) to mild (OCA71), which corresponded with absorbance measures made by QBAM. Despite iRPE from OCA1A patients producing low levels of pigment, the absorbance values were 2× higher than the lowest sensitivity of QBAM (10 mAU). Taken together, these data demonstrate the accuracy, reproducibility, and sensitivity of QBAM imaging.

Deep Neural Network Prediction of iRPE Function from Absorbance Images iRPE from each healthy donor (Healthy-1, Healthy-2) were imaged to determine if QBAM imaging affected cell maturation and could measure a large range in variation of iRPE pigmentation. This was done using three culture conditions: (1) control iRPE (no treatment), (2) iRPE treated with a known inducer of RPE maturation (Aphidicolin), and (3) iRPE treated with a known inhibitor of RPE maturation (hedgehog pathway inhibitor-4, HPI4).

Control and aphidicolin-treated iRPE were found to mature as expected with increasing image absorbance over the 8-week culture while HPI4-treated iRPE had a decreasing trend in absorbance over time (referred to as Healthy-2 and Healthy-1). Higher mRNA and protein expression of maturation markers were found in control and Aphidicolin treated iRPE than in HPI4 treated iRPE. The baseline electrical response (TEP and TER) and its change to physiological treatments of 1 mM potassium ($K^+$) or 100 µM adenosine triphosphate (ATP) was significantly greater in Aphidicolin treated iRPE and significantly lower in HPI4-treated iRPE relative to control. Further, iRPE maturation was evident from the presence of dense, native-like apical processes. From this set of experiments, it can be concluded that: (1) iRPE produced in clinical grade conditions had a mature-epithelial phenotype, (2) weekly QBAM imaging did not impact iRPE maturation, and (3) differences in pigmentation between mature (control and Aphidicolin) and immature (HPI4) iRPE could be quantified with QBAM imaging.

The capacity to predict iRPE monolayer function and phenotype from QBAM images of iRPE was assessed next. For healthy donor iRPE, mean QBAM pixel value had little correlation with TER. However, the TER predictions by DNN-F highly correlated with actual TER values for the same samples and these predictions had an RMSE of 70.6 $\Omega \cdot cm^2$. To incorporate this methodology into a biomanufacturing setting, a TER of 400 Ω·cm² was used as a stringent threshold to classify iRPE monolayers as immature (<400 Ω·cm²) or mature (>400 Ω·cm²). False positives, false negatives, and TER values associated with immature iRPE were determined. Based on this TER threshold, the DNN-F was 94% accurate, sensitivity was 100%, and specificity was 90% for classifying iRPE maturity. Similar trends were observed for VEGF-Ratios, where the polarized release of VEGF did not correlate well with QBAM mean pixel value, but DNN-F predictions correlated highly with VEGF-Ratio measurements ($R^2$=0.89), and the RMSE of the VEGF-Ratio predictions was less than 1.0. The accuracy, sensitivity, and specificity of the VEGF-Ratio were all 100% (wherein samples with VEGF-Ratio<3.0 were considered immature). From these experiments, it can be concluded that (a) QBAM images of living cells can be used to predict TER and VEGF-Ratios with high fidelity, and (b) QBAM imaging could be used as a non-invasive means of functional validation of cells in lieu of measuring TER and/or VEGF-Ratio.

Extraction of Single Cell Features from Live QBAM Images of iRPE Monolayers

DNNs are known to have superior predictive power relative to other machine learning algorithms, but it is difficult to determine which image features DNNs use to make predictions. To understand which cell image parameters of iRPE predict monolayer function, image features of individual iRPE cells in QBAM images were calculated and used to train SML algorithms to predict iRPE function. A DNN was created to segment individual living iRPE cells in QBAM images (via DNN-S). The DNN-S segmentation was validated by comparing cell features calculated from 12,750 iRPE with the same cell features calculated from ground-truth hand segmentations. A comparison of 44 different features for DNN-S versus hand-corrected segmentations (see Table 1 below) showed a difference of 7.94%±4.42% (mean±standard deviation) between the feature histograms with good pixel-wise agreement (F−2=0.71).

TABLE 1

Quantification Of The % Error And Distribution From Manual Measures Of 44 Morphological Features And From DNN-S Segmentations.

| Feature | Error (%) | KSS (p-Value) | KMMD (p-Value) | $X^2$ (p-Value) |
| --- | --- | --- | --- | --- |
| Orientation | 7.7 | <0.001 | 0.150 | 0.247 |
| Bounding Box X Min | 10.1 | <0.001 | 0.190 | 0.624 |
| Bounding Box Y Min | 10.4 | <0.001 | 0.240 | 0.246 |
| Centroid Y | 12.0 | <0.001 | 0.250 | 1.000 |
| Weighted Centroid X | 11.8 | <0.001 | 0.280 | 0.372 |
| Eccentricity | 17.9 | 0.178 | 0.990 | <0.001 |
| Extent | 10.2 | 0.526 | 0.990 | <0.001 |
| Major Axis Length | 9.7 | 0.257 | 0.990 | <0.001 |
| Minor Axis Length | 18.5 | 0.102 | 0.990 | <0.001 |
| Area | 14.2 | 0.514 | 0.990 | <0.001 |
| Perimeter | 12.6 | 0.898 | 0.990 | <0.001 |
| Equivalent Diameter | 13.6 | 0.349 | 0.990 | <0.001 |
| Solidity | 17.1 | 0.007 | 0.990 | <0.001 |
| Filled Area | 14.3 | 0.996 | 0.990 | <0.001 |
| Mean Intensity | 3.3 | 0.174 | 0.990 | <0.001 |
| Min Intensity | 4.6 | 0.178 | 0.990 | <0.001 |
| Max Intensity | 3.4 | 0.003 | 0.990 | 0.256 |
| Standard Deviation | 3.9 | 0.174 | 0.990 | <0.001 |
| Contrast 0 | 5.1 | 0.319 | 0.990 | <0.001 |
| Contrast 45 | 4.0 | 0.531 | 0.990 | <0.001 |
| Contrast 90 | 5.0 | 0.720 | 0.990 | <0.001 |
| Contrast 135 | 4.4 | 0.169 | 0.990 | <0.001 |
| Correlation 0 | 4.6 | 0.007 | 0.990 | <0.001 |
| Correlation 45 | 5.3 | 0.012 | 0.990 | <0.001 |
| Correlation 90 | 4.5 | 0.106 | 0.990 | <0.001 |
| Correlation 135 | 5.0 | 0.178 | 0.990 | <0.001 |
| Energy 0 | 5.0 | 0.066 | 0.990 | <0.001 |
| Energy 45 | 6.1 | 0.066 | 0.990 | <0.001 |
| Energy 90 | 5.2 | 0.066 | 0.990 | <0.001 |
| Energy 135 | 6.2 | 0.066 | 0.990 | <0.001 |
| Homogeneity 0 | 4.6 | 0.175 | 0.990 | <0.001 |
| Homogeneity 45 | 5.3 | 0.144 | 0.990 | <0.001 |
| Homogeneity 90 | 4.7 | 0.330 | 0.990 | <0.001 |
| Homogeneity 135 | 4.2 | 0.077 | 0.990 | <0.001 |
| Mode Intensity | 3.4 | 0.819 | 0.990 | 0.004 |
| Skewness | 4.9 | 0.781 | 0.990 | <0.001 |
| Kurtosis | 5.4 | 0.696 | 0.990 | <0.001 |
| Central Moment 2 | 3.8 | 0.959 | 0.990 | <0.001 |
| Central Moment 3 | 8.0 | 0.283 | 0.990 | <0.001 |
| Central Moment 4 | 4.6 | 0.802 | 0.990 | <0.001 |
| Central Moment 5 | 14.8 | 0.316 | 0.990 | <0.001 |
| Central Moment 6 | 6.6 | 0.985 | 0.990 | <0.001 |
| Bounding Box Width | 12.0 | 0.206 | 0.990 | <0.001 |
| Bounding Box Height | 11.3 | 0.316 | 0.990 | <0.001 |

In Table 1, % Error indicates the absolute difference in counts at each value in a histogram. Two-sample Kolmogorov-Smirnov statistic (KSS), Kernel Maximum Mean Discrepancy (KMMD, and X2 values are three different ways to assess differences in distributions, wherein KSS—is used in non-parametric distributions, KMMD—has no assumptions in initial distribution, and X2 is a chi-squared test for normally distributed features.

QBAM imaging and live cell segmentation allows for hundreds of cell image features to be measured and tracked non-invasively on individual cells throughout iRPE maturation. Thus, the trained DNN-S was used to segment QBAM images of living iRPE (Healthy-1 and Healthy-2 donors) treated with Aphidicolin, HPI-4, or nothing (control). Previously published cell image features and intensity metrics known to correlate to RPE maturation and health were then assessed for significance. By observing the average number of neighbors each iRPE cell had as a function of drug treatment, it was able to seen that HPI4 had significantly lower (p<0.001) mean number of neighbors across all time points. Importantly, this technique allows for unprecedented hierarchical granularity to the data; enabling not just whole well "bulk" tissue measurements, but also as a function of field of view or at an individual cell level Clustering of treatments based off of two features known to be important to RPE maturation and health, cell area and mean cell intensity were performed. Cell minimum intensity, a new metric related to iRPE function identified using SML, is described further below. These results demonstrate (a) the accuracy of the DNN-S segmentation with respect to hand drawn segmentations of individual cells, and (b) the differences between iRPE treated with different molecules can be described with discrete cell features.

Single Cell Image Features can Predict iRPE Maturation and Function

Five different SML methods (multilayer perceptron—MLP, linear support vector machine—L-SVM, random forest—RF, principle least squares regression—PLSR, and ridge regression—RR) were used to predict TER and VEGF-Ratios from the Healthy-2 donor iRPE using cell features obtained from cell-border segmentations of QBAM images. TER predictions for the MLP were found to be the most accurate SML approach, having RMSE=84.7 $\Omega \cdot cm^2$ and $R^2$=0.94. False positives and negatives were determined when using 400 $\Omega \cdot cm^2$ as a Quality Assurance or Quality Control (QA/QC) threshold. The MLP had an accuracy of 94%, sensitivity of 100%, and of specificity 90%. However, a comparison of all algorithms showed the DNN-F was the most accurate predictor of TER, with the MLP's RMSE being 14.1 $\Omega \cdot cm^2$ higher than DNN-F. For VEGF-Ratio predictions, random forest (RF) was the best SML method, but DNN-F had a 1.4× lower RMSE.

The benefit of predicting iRPE monolayer function from cell features is the ability to determine single cell characteristics that indicate tissue-level function. For each SML method, cell features were ranked by importance. When comparing all SML models there was similarity in the most important features for predicting TER or VEGF-Ratio, regardless of which SML method was used. Interestingly, key cell image features for predicting TER were spread across intensity, texture, and shape of cells. Of the 10 most important features, three related to the shape of cells (Shape), three to the intensity of pigment within cells (Intensity), and four describe the distribution of pigment within RPE (Texture). Table 2 shows an excerpt of which metrics specifically these features represent and their 95% confidence interval for each time point and drug treatment.

TABLE 2

Subset of the full set of features for modeling Healthy-2 data with their mean, 95% confidence interval (CI), and Standard Error

| Week | Treatment | Feature | Class ID | Mean | 95% C I Lower | 95% CIper | SW. Error |
|---|---|---|---|---|---|---|---|
| 2 | Aphidicolin | ML_MinIntensity.Mean | Intensity 1 | 144.67 | 142.21 | 147.12 | 1.24 |
| 3 | Aphidicolin | ML_MinIntensity.Mean | Intensity 1 | 204.31 | 200.99 | 207.63 | 1.68 |
| 4 | Aphidicolin | ML_MinIntensity.Mean | Intensity 1 | 14643 | 144.24 | 148.62 | 1.11 |
| 5 | Aphidicolin | ML_MinIntensity.Mean | Intensity 1 | 183.77 | 179.93 | 187.61 | 1.94 |
| 6 | Aphidicolin | ML_MinIntensity.Mean | Intensity 1 | 185.15 | 182.39 | 187.91 | 1.4 |
| 7 | Aphidicolin | ML_MinIntensity.Mean | Intensity 1 | 180.84 | 177.72 | 183.96 | 1.58 |
| 2 | Control | ML_MinIntensity.Mean | Intensity 1 | 16E16 | 162.11 | 168.21 | 1.54 |
| 3 | Control | ML_MinIntensity.Mean | Intensity 1 | 225.1 | 220.69 | 229.5 | 2.23 |
| 4 | Control | ML_MinIntensity.Mean | Intensity 1 | 187.53 | 183.97 | 191.08 | 1.8 |
|  | Control | ML_MinIntensity.Mean | Intensity 1 | 203.86 | 201.35 | 206.36 | 1.27 |
| 6 | Control | ML_MinIntensity.Mean | Intensity 1 | 208.14 | 205.52 | 210.75 | 1.32 |
| 7 | Control | ML_MinIntensity.Mean | Intensity 1 | 213.22 | 210.36 | 216.08 | 1.44 |
| 2 | HPI4 | ML_MinIntensity.Mean | Intensity 1 | 141.81 | 138.76 | 144.85 | 1.54 |
| 3 | HPI4 | ML_MinIntensity.Mean | Intensity 1 | 179.97 | 176.23 | 183.72 | 1.89 |
| 4 | HPI4 | ML_MinIntensity.Mean | Intensity 1 | 104.78 | 102.43 | 107.12 | 1.19 |
|  | HPI4 | ML_MinIntensity.Mean | Intensity 1 | 133.78 | 131.13 | 136.42 | 1.34 |
| 6 | HPI4 | ML_MinIntensity.Mean | Intensity 1 | 126.02 | 124.17 | 127.87 | 0.94 |
| 7 | HPI4 | ML_MinIntensity.Mean | Intensity 1 | 110.26 | 108.46 | 112.06 | 0.91 |
| 2 | Aphidicolin | CPI_IntegratedIntensityEdge.K | Intensity 10 | 5.87 | 5.33 | 6.41 | 0.27 |
| 3 | Aphidicolin | CPI_IntegratedIntensityEdge.K | Intensity 10 | 6.07 | 5.36 | 6.77 | 0.36 |
| 4 | Aphidicolin | CPI_IntegratedIntensityEdge.K | Intensity 10 | 5.3 | 4.85 | 5.76 | 0.23 |
|  | Aphidicolin | CPI_IntegratedIntensityEdge.K | Intensity 10 | 5.59 | 4.79 | 6.38 | 0.4 |
| 6 | Aphidicolin | CPI_IntegratedIntensityEdge.K | Intensity 10 | 4.76 | 4.26 | 5.26 | 0.25 |
| 7 | Aphidicolin | CPI_IntegratedIntensityEdge.K | Intensity 10 | 4.53 | 3.97 | 5.09 | 0.28 |
| 2 | Control | CPI_IntegratedIntensityEdge.K | Intensity 10 | 4.98 | 4.5 | 5.46 | 0.24 |
| 3 | Control | CPI_IntegratedIntensityEdge.K | Intensity 10 | 6.13 | 5.59 | 6.68 | 0.27 |
| 4 | Control | CPI_IntegratedIntensityEdge.K | Intensity 10 | 5.2 | 4.71 | 5.69 | 0.25 |
|  | Control | CPI_IntegratedIntensityEdge.K | Intensity 10 | 5.1 | 4.6 | 5.6 | 0.25 |
| 6 | Control | CPI_IntegratedIntensityEdge.K | Intensity 10 | 4.76 | 4.13 | 5.38 | 0.31 |
| 7 | Control | CPI_IntegratedIntensityEdge.K | Intensity 10 | 5.19 | 4.4 | 5.98 | 0.4 |
| 2 | HPI4 | CPI_IntegratedIntensityEdge.K | Intensity 10 | 5.11 | 4.65 | 5.56 | 0.23 |
| 3 | HPI4 | CPI_IntegratedIntensityEdge.K | Intensity 10 | 6.45 | 5.89 | 7.01 | 0.29 |
| 4 | HPI4 | CPI_IntegratedIntensityEdge.K | Intensity 10 | 6.45 | 5.85 | 7.04 | 0.3 |
|  | HPI4 | CPI_IntegratedIntensityEdge.K | Intensity 10 | 7.21 | 6.62 | 7.8 | 0.3 |
| 6 | HPI4 | CPI_IntegratedIntensityEdge.K | Intensity 10 | 8.06 | 7.28 | 8.84 | 0.39 |
| 7 | HPI4 | CPI_IntegratedIntensityEdge.K | Intensity 10 | 8.06 | 7.32 | 8.8 | 0.38 |

Taken together, the above indicates that using live cell segmentation, feature extraction, and SML, tissue TER and VEGF-Ratio can be predicted with a level of accuracy approaching the prediction accuracy of DNNs to analyze QBAM images. The benefit to SML methods compared to DNNs is that SML models can identify discrete cell features that indicate iRPE monolayer function, allowing manufacturers to derive cell image feature confidence intervals for cell therapeutics' release criteria.

Accuracy of Function Predictions is Robust Across Multiple Clinical-Grade AMD Patient Derived iRPE To determine robustness across multiple donors and multiple preparations, DNN-F and SMLs were used to predict TER and VEGF-Ratios of clinical grade iRPE from three AMD patients across 8 iPSC clones. Absorbance images of iRPE samples from each of the AMD donors and corresponding SEM images of iRPE apical processes confirmed iRPE polarized phenotype. Monolayer maturation was assessed by TER and VEGF-Ratio as well as other assays. Mean QBAM pixel values of iRPE were measured for fully-mature AMD-iRPE. As with the healthy donors, mean absorbance did not correlate well with TER (having $R^2=0.015$) or VEGF-Ratio (having $R^2=0.50$). However, the random forest (RF) model was able to predict TER to a similar degree of accuracy (having RMSE=70.9 Ω·cm2, $R^2=0.92$) as with Healthy donors. DNN-F was also used to model TER and the predicted vs. actual values correlated well (having $R^2=0.91$).

To assess the robustness of the approach, SML models were trained on different combinations of AMD-iRPE monolayers. A total of 18 unique training image subsets were formed, where each image subset contained test data which had images of one iRPE sample from each donor. The mean TER RMSE was 86.9 Ω·cm$^2$+/−14.3Ω·cm$^2$ (as shown in Table 5 below) across all clone subsets, showing that the prediction error is similar when scaled to a larger donor subset (having eight AMD-iRPE samples) as compared to a single sample (Healthy-2). From the measured and predicted values, a 95% confidence interval was constructed. iRPE falling outside of this region could be considered as "out of specification" in a biomanufacturing environment and would be recommended for further testing.

Finally, the most important cell features for predicting AMD-iRPE monolayer TER and VEGF-Ratio across all donor/sample combinations was assessed to determine if features used to predict AMD-iRPE function were similar to those of Healthy-2. Interestingly, only four features overlapped between these two groups—Zernike n4-l0 polynomial (Shape 1), mass displacement (Intensity 2), and the third inverse difference moment at 135° (Texture 2) and at 45° (Texture 1). Overall, the models derived from the clinical grade iRPE images were able to predict iRPE phenotype across multiple donors/samples and to determine the common cell image features of living cells across multiple donors that predict iRPE monolayer function. Further, the differences in the feature importance from Healthy-2 and the AMD-iRPE suggest there might be both donor specific features for predicting function, as well as features that are common to multiple donors.

Classification of Developmental Outliers and Identity of iRPE Donors Using QBAM

QBAM images were used to determine if there were any developmental outliers based on cell image features in the eight clinical grade iRPE samples from three AMD patients. Developmental outliers are defined as iRPE monolayers that are different from other iRPE monolayers based on cell image features and may warrant additional analysis to determine if the monolayer developed properly. Principle component analysis was applied to cell image features from the QBAM images of the AMD donor/sample preparation. iRPE derived from a given donor clustered well together based on cell image features, except AMD1 clone A (1A) and AMD3 clone A (3A) as identified in the hierarchical dendrogram of the PCA. Analysis of clone 1A iRPE showed 894 changes in the onco-exome as compared to starting donor material. Clone 3A iRPE was found to have a lower pigment level than its "sibling" iRPE. When the cell image features were analyzed the cell pigmentation and shape were found to be the two most dominant feature classes in identifying these iRPE as outliers; a full description of features can be seen in the online dataset.

For each iRPE monolayer, the cell donor was predicted from QBAM images using multiple SML models. Additionally, a new DNN (DNN-I) was developed to determine if two different iRPE images came from the same donor. The SML algorithms took the features derived from QBAM images as an input and gave a donor identification as an output. In comparison, DNN-I took two QBAM images as an input, and classified the images as coming from the same or different donors. The SML approach was able to classify the donor identity of new clones of a donor when it had been trained on images from other clones from that same donor, it was not able to classify "new" donors that were not present in the training data. While the DNN-I strategy for binary classification of two images as "same" or "not same" gives the DNN-I the potential to classify "new" donors that were not used during training. Linear support vector machines (L-SVM) were found to have the highest accuracy of all SML algorithms tested with an accuracy of 76.4% (2.3× random chance), a sensitivity of 64.6%, and a specificity of 82.3%. Across all donor/sample combinations, DNN-I had better performance with an accuracy of 85.4% (2.6× random chance), a sensitivity of 80.9%, and a specificity of 86.8%. Interestingly, cell image features that were key to distinguishing AMD iRPE from each other were similar across different iRPE combinations and consist of features that were different from the features used to identify tissue function and developmental outliers. A general difference between the top 50 features used in each application were: shape features were important to identify clones as outliers (23 of the top 50 features), texture features were important for donor classification of clones (25 of the top 50 features), and shape and texture features were important to classify iRPE function (40 of the top 50 features).

Absorbance Imaging Discussion

Data inputs are critical to successful analysis. Thus, the image processing pipeline developed here starts with a rigorous, reproducible absorbance imaging method using a bright field microscope. The QBAM technology developed here can be implemented on any standard-bright field microscope and uses real-time, automated, statistically robust methods to provide high confidence in image quality and reproducibility. The advantage to using absorbance rather than raw pixel intensities is that absorbance is an absolute measure of light attenuation. Raw pixel intensities can vary with microscope configuration and settings (e.g. uneven lighting, bulb intensity and spectrum, camera, etc.) that make comparison of images difficult even when the images are captured on the same microscope. Converting to absorbance values overcomes many issues related to image reproducibility. The combination of automation, converting pixel intensities to absorbance values, calculating absorbance confidence, and establishing microscope equilibrium through benchmarking ensures the quality of image data captured with QBAM.

The robustness of QBAM was validated in three systems to ensure the measurement could be used in multiple circumstances: (1) synthetic standards, (2) healthy biological samples, and (3) drug induced models of iRPE maturity. Analysis of the QBAM images showed absorbance values agreed with "known" synthetic standards and could assess the development of pigment in both healthy and diseased RPE. The results also highlight the robustness of the measurement across multiple microscopes or imaging configurations. Errors between different microscope measurements of the same sample were within 4.4% of the signal as compared to an average error of 31% on reference standards for VEGF ELISAs and 100% for TER measurements in epithelium. This represents one to two orders of magnitude reduction in variability for a potential release assay for a cell therapy product or when used in a drug screening platform.

QBAM is optimized for determining absorbance for cell types that absorb light. Therefore, it may be suitable for assays where light absorbance is used, such as viable cell counting using trypan blue staining, histological staining, or analysis of light-absorbing biological specimens such as pigmented skin cells or dopaminergic neurons that express neuromelanin. In cases where transmittance values may be preferred such as histology, the statistics can be modified to generate reproducible images of tissue sections. Also, this methodology is generalizable to any multi-spectral modality since none of the calculations are wavelength specific. Finally, it is expected that the methods could be suitable for hyperspectral autofluorescent imaging which can identify cell borders and sub-cellular organization in non-pigmented cells.

Discussion of Prediction of iRPE Function

Neural networks and machine learning algorithms were trained with a full range of cell phenotypes by using healthy iRPE and drugs that were known to inhibit (HPI4) and promote (Aphidicolin) iRPE maturation. Having diverse phenotypes in the training set enhanced the robustness of the algorithms Additionally, the method worked on two different donors not only as an end-point assay of tissue health, but also as a non-invasive tool for tracking tissue development during the long maturation period (≈35 days). Importantly, the accuracy of the algorithms in predicting both TER and VEGF-Ratio was close to the measurement uncertainty for both TER and VEGF.

Cut-off ratios for biomanufacturing, 400 $\Omega \cdot cm^2$ for TER and 3 for VEGF-Ratio, were chosen. However, it is important to note that similar accuracies, sensitivities, and specificities were found when assessing a range of TER values from 200 $\Omega \cdot cm^2$ to 1000 $\Omega \cdot cm^2$ or VEGF-Ratio from 1 to 5 and thresholds should be set according to the manufacturers specifications. In this study a higher prediction error was observed for the iRPE from Healthy-2 compared to the prediction error of iRPE from multiple AMD donors. Two reasons for this are hypothesized: (1) Healthy-2 iRPE had a wider range of both TER and VEGF-Ratio values due to the inclusion of positive and negative controls than did AMD-iRPE which were created in a cGMP facility with the goal of reproducibly manufacturing healthy mature iRPE monolayers. (2) The AMD-iRPE had a larger dataset for training as it included all Healthy-2 data as well as the training data from the AMD-iRPE. In machine learning more data generally leads to more accurate models; however, implementation of the platform in any application should give special consideration to ensuring a wide range of conditions (i.e., more donors and positive/negative controls) for training than presented in this proof-of-principle study to ensure the robustness of the model.

As expected, deep learning had a lower RMSE of prediction for both TER and VEGF-Ratio as compared to the SML approaches. However, using SML approaches allowed discovery of important cell image features. These two approaches were chosen because two motivations were perceived for cellular product manufacturers, regulators, clinicians, and/or researchers. Motivation 1: often in manufacturing, clinical settings, or high throughput screens, time is a critical factor and a clear "go/no-go" or simple read-out is desired. In these cases, algorithms that provide the highest accuracy and are most robust to noise should be used, and deep learning is an excellent tool for this application. Motivation 2: frequently in research, insight into underlying mechanisms of function are important. In these cases, more scrutable methods in which the importance of cell image features can be determined are necessary. For this motivation SML approaches are desirable because their underlying architecture is simple enough to be understood and the importance of factors (here cell image features) to predicting tissue function can be obtained.

Feature extraction from QBAM images leads to hundreds of features based on the shape, intensity and texture of cells at both the single cell level and across larger cell populations. Many of these features are mathematical abstractions that lack meaningful connection to cell function. Therefore, even though SML models may be more interpretable than DNNs, the features that compose these models may not be relatable to the underlying biology. Nonetheless, for cell manufacturing purposes what these features are and how they relate to the underlying biology is less important than being able to identify their 95% confidence interval and ensuring that future batches/clones from donors fall within this range; making their use here in SML models relevant regardless of their relationship to the underlying biology.

Discussion of Classification and Clustering of iRPE from Clinically Relevant Donors Currently, there is a critical need to develop a non-invasive, clinically-compatible, assay to confirm identity and quality of cell therapy products just prior to implantation. The PCA and cluster analysis could serve this unmet need. Using this approach, or similar clustering techniques, the similarity of the to-be implanted article to other technical replicates (or previous successful manufactured batches) can be non-invasively assessed for the first time. Additionally, the classification work done using DNN-I or the L-SVM can serve as a QA/QC step to detect cell implant manufacturing errors and to match identity of this implant to other replicates from the same donor. This will be especially important in a facility that manufactures thousands of autologous therapeutics and must confirm the identity of each patient's dose.

Two of the most important features to identifying developmental outliers were determined to be the standard deviation of the maximum intensity (Intensity 8) of the iRPE and the Zernike n5-l3 polynomial (Shape 10). The deviation of the max intensity parameter agrees well with absorbance results showing that AMD3 Clone A derived iRPE had a lower absorbance than iRPE derived from other clones of AMD3. While zernike polynomials have been useful for detecting invasive cancer cell shapes and in classifying tumors, it is hypothesized that this was critical to detecting a difference between AMD1 clone A (that had 894 onco-exome mutations) and other AMD-iRPE lines. Although this cluster analysis may not be a conclusive proof that the development of oncogene mutations can be identified with only QBAM imaging, in a cell therapy manufacturing setting, it is proposed that cluster analysis could be used to screen individual therapy replicates to determine if there are outliers that might need additional scrutiny. Also, because the assay is non-invasive, this information can provide surgeons with additional confidence in the quality of the actual transplant being delivered to the patient which has not been possible previously.

In conclusion, the work presented here shows that QBAM imaging can be used to assess the pigmentation development of healthy and diseased iRPE non-invasively. DNNs can analyze these images and accurately predict cell TER and VEGF-Ratio across 10 different iRPE preparations. Additionally, QBAM images contain sufficient information to allow DNNs to accurately segment RPE borders of live RPE. Once segmented, hundreds of features can be calculated per cell and, using these features, cell function can be predicted, outlier samples can be identified, and donor identity can be confirmed. All of this information can be obtained on the tissue that is being implanted into the patient with an automated bright-field microscope, without the need for expertise from a clinician, in just minutes. Thus, QBAM has potential application in a biomanufacturing setting where thousands of manufactured RPE units could be non-invasively tested and qualified for clinical use by a technician.

Experimental Model and Subject Details iRPE Cell Source and Culture

Human Cell Sources

Collection and processing of all human work was done under institutional review board-approved protocol #11-E1-0245 at NIH. A total of 15 iRPE cell lines were used in this paper, obtained from 10 different donors. The iRPE lines were obtained from three types of patients: healthy, AMD patients, and OCA patients. The iRPE from healthy patients (referred to as Healthy-1 and Healthy-2) were derived from iPSC lines BEST4C and LORDY9 respectively. The iRPE from AMD patients are referred to according to donor number and clone number. For example, AMD1A means the cells came from AMD donor #1 and clone A. The different clones for each donor were replicates, where each clone was completely replicated from generation of iPSCs to iRPE differentiation. The AMD clones were previously reported in Sharma, et al., Patient-Specific Clinical-Grade iPS Cell-Derived Retinal Pigment Epithelium Patch Rescues Retinal Degeneration in Rodent and Pig Eyes, Sci. Transl. Med. Under Review (2018). A summary of the number of clones per donor is as follows: AMD1 had Clone A and Clone B, AMD2 had Clone A, Clone B, and Clone C, and AMD3 had Clone A, Clone B, and Clone C. The iRPE obtained from OCA patients (also referred to as albino patients), came from five different patients (a single clone each) and indicated by OCAS, OCA26, OCA103, OCA9, and OCA71. Details on the age and sex of each donor are and information about key resources are provided in Table 3.

TABLE 3

| KEY RESOURCES | | |
|---|---|---|
| REAGENT or RESOURCE | SOURCE | IDENTIFIER |
| Antibodies | | |
| Mouse Monoclonal Anti-RPE65 | Abcam | Cat# ab13826 |
| Mouse Monoclonal Anti-Ezrin | Sigma-Aldrich | Cat# E8897 |
| Mouse Monoclonal Anti-GT335 | Adipogen | Cat# AG-20B-0020-C100 |
| Goat Polyclonal anti-Mouse Alexa 594 | ThermoFisher | Cat# A-11032 |
| Mouse Monoclonal anti-ZO1 | ThermoFisher | Cat# 339188 |
| Critical Commercial Assays | | |
| EVOM2 | World Precision Instruments | |
| ENDOHM-12 | World Precision Instruments | |
| Luminex VEGF Assay (VEGF-A and VEGF-B) | R&D Systems | |
| Experimental Models: Cell Lines | | |
| Healthy-1 (Age 48, Female) | This paper | Internal Ref: BEST3V |
| Healthy-2 (Age 59, Male) | This paper | Internal Ref: LORDY9 |
| OCA8 (Age 15, Male) | This paper | |
| OCA9 (Age 13, Female) | This paper | |
| OCA26 (Age 14, Female) | This paper | |
| OCA71 (Age 13, Male) | This paper | |
| OCA103 (Age 25, Male) | This paper | |
| AMD1, Clone A (Age 85, Male) | Sharma et al., 2018 | Defined in Sharma et al as D2B |
| AMD1, Clone B (Age 85, Male) | Sharma et al., 2018 | Defined in Sharma et al as D2C |
| AMD2, Clone A (Age 89, Male) | Sharma et al., 2018 | Defined in Sharma et al as D3A |
| AMD2, Clone B (Age 89, Male) | Sharma et al., 2018 | Defined in Sharma et al as D3B |
| AMD2, Clone C (Age 89, Male) | Sharma et al., 2018 | Defined in Sharma et al as D3C |

TABLE 3-continued

KEY RESOURCES

| REAGENT or RESOURCE | SOURCE | IDENTIFIER |
|---|---|---|
| AMD3, Clone A (Age 87, Female) | Sharma et al., 2018 | Defined in Sharma et al as D4A |
| AMD3, Clone B (Age 87, Female) | Sharma et al., 2018 | Defined in Sharma et al as D4B |
| AMD3, Clone C (Age 87, Female) | Sharma et al., 2018 | Defined in Sharma et al as D4C |
| Oligonucleotides | | |
| RPE65 | Bio-Rad | Cat# qHsaCED0043699 |
| MITF | Bio-Rad | Cat# qHsaCED0037870 |
| PAX6 | Bio-Rad | Cat# qHsaCID0012192 |
| BEST1 | Bio-Rad | Cat# qHsaCED0046514 |
| CLDN19 | Bio-Rad | Cat# qHsaCED0036713 |
| PMEL | Bio-Rad | Cat# qHsaCED0036713 |
| TYR | Bio-Rad | Cat# qHsaCID0014521 |
| OCA2 | Bio-Rad | Cat# qHsaCID0017771 |
| B2M | Bio-Rad | Cat# qHsaCID0015347 |
| RPL13A | Bio-Rad | Cat# qHsaCED0020417 |
| RLBP1 | Bio-Rad | Cat# qHsaCID0008073 |

Cell Culture Conditions and Media

All cells were cultured in a cell culture incubator at 37° C. and 5% CO2. Depending on the stage of cell development, different cell medium was used. The different cell media used include:

Neuro Ectoderm Induction Medium (NEIM)—DMEM/F-12 (Thermo Fisher, 11330-032), KOSR (CTS KnockOut SR XenoFree Kit, Thermo Fisher, A1099201), supplemented with 1% (mass/volume) N-2 (Thermo Fisher, A13707-01), 1× B-27 (Thermo Fisher, 17504-044), LDN-193189 10 µmol/LM (Stemgent, 04-0074-10), SB 431452 10 nmol/L (R&D Systems, 1614), CKI-7 dihydrochloride 0.5 µmol/L (Sigma Aldrich, C0742-5 mg), and IGF-1 1 ng/ml (R&D Systems, 291-GMP-5.5 ug).

RPE Induction Medium (RPEIM)—DMEM/F-12 (Thermo Fisher, 11330-032), KOSR (Thermo Fisher, A1099201), supplemented with 1% N-2 (Thermo Fisher, A13707-01), 1× B-27 (Thermo Fisher, 17504-044), LDN-193189 100 µmol/L (Stemgent, 04-0074-10), SB 431452 100 nmol/L (R&D Systems, 1614), CKI-7 dihydrochloride 5 µmol/L (Sigma Aldrich, C0742-5 mg), IGF-1 10 ng/ml (R&D Systems, 291-GMP-5.5 ug), and PD0325901 1 µmol/L (Stemgent 04-0006).

RPE Commitment Medium (RPECM)—DMEM/F-12 ( ) KOSR (Thermo Fisher, A1099201), supplemented with 1% N-2 (Thermo Fisher, A13707-01), 1× B-27 (Thermo Fisher, 17504-044), nicotinamde 10 mmol/L (Sigma Aldrich, PHR1033-1G), and Activin A 100 ng/ml (R&D Systems, AFL 338).

RPE Growth Medium (RPEGM)—MEMα (Thermo Fisher, 12571-063), supplemented with 1% N-2 (Thermo Fisher, A13707-01), 1% (mass/volume) Glutamine (GlutaMAX Supplement, Thermo Fisher, 35050061), 1% (mass/volume) non-essential amino acids (MEM Non-Essential Amino Acids Solution (100×), Thermo Fisher, 11140-050), 0.25 mg/ml taurine (Sigma Aldrich, PHR1109-1G), 20 ng/ml hydrocortisone (50 µmol/L solution, Sigma Aldrich, H-6909), 13 pg/ml triiodo-thyronin (Sigma Aldrich, T5516), 5% (volume/volume) FBS (fetal bovine serum, GE Healthcare/Hyclone, SH30071.03).

RPE Maturation Medium (RPEMM)—MEMα (Thermo Fisher, 12571-063), supplemented with 1% (mass/volume) N-2 (Thermo Fisher, A13707-01), 1% (mass/volume) Glutamine (Thermo Fisher, 35050-061), 1% (mass/volume) non-essential amino acids (Thermo Fisher, 11140-050), 0.25 mg/ml taurine (Sigma Aldrich, PHR1109-1G), 10 ng/ml hydrocortisone (Sigma Aldrich, H-6909), 13 pg/ml yriiodo-thyronin (Sigma Aldrich, T5516), 5% (volume/volume) FBS (GE Healthcare/Hyclone, SH30071.03), 50 uM PGE2 (Prostaglandin E2, R&D Systems, 2296).

Transformation and Differentiation of Human iRPE

All iRPE were developed using a clinical grade protocol that has been outlined previously (Sharma et al., 2018). Briefly, iPSCs clones were derived from CD34+ PBMCs using a previously published protocol (Mack et al., Generation of Induced Pluripotent Stem Cells from CD34+ Cells across Blood Drawn from Multiple Donors with Non-Integrating Episomal Vectors, W.B. (2011)). iPSCs cells were then seeded on 5 ug/ml vitronectin (ThermoFisher, A147015) coated tissue culture plates (Thermo Sci., 140675) or T75 flasks (Corning, 430641U) with E8 Medium (Essential 8 Medium, ThermoFisher, A1517001). After 2 days, cell media was changed to RPEIM for 10 days and then to RPECM for 10 more days. On day 22, cell media was switched to RPEGM. At day 27 cells were disassociated using Versene Solution (0.2 g EDTA (ethylenediaminetetraacetic acid) per liter of phosphate buffered saline, Thermo Fisher, 15040-066) and reseeded in a new culture plate (Thermo Sci., 140675) or T75 flask (Corning, 430641U) with RPEGM. On day 42, cells were disassociated using CTS TrypLE Select Enzyme (Thermo Fisher, A12859-01) and reseeded at 500,000 cells/ml on to biodegradable nanofiber scaffolds [Stellenbosch Nanofiber Company, Fiber-Scaff-RPE™ 3 D cell culture scaffolds] (AMD lines) or onto 12-well 0.4 µm polycarbonate transwell plates (Corning, 3401) (Healthy and OCA lines) and cultured with RPEMM. Day 42 seeded RPE were considered to be time 0 iRPE and all timing for drug treatments, imaging, assay collection, etc. in the experiments outlined in this manuscript count from this day.

Method Details

Quantitative Bright-Field Absorbance Microscopy

Underlying Principle

The basic principle behind QBAM imaging was the absorbance measurement, which is an absolute measurement of light attenuation, as described in Equation 1:

$$A(\lambda) = -\log_{10} \frac{I(\lambda)}{I_0(\lambda)} \quad \text{Equation 1}$$

A is the absorbance value at wavelength A, $I(\lambda)$ is the intensity of light passing through a sample and $I_0(\lambda)$ is the intensity of light when no sample was present. One reason why absorbance was of interest in this study was that the Beer-Lambert law establishes the relationship between absorbance and chemical concentration as shown in Equation 2:

$$A(\lambda) = \varepsilon l C \quad \text{Equation 2}$$

C is the chemical concentration in a sample, ε is the molar attenuation coefficient, and l is the path length of the beam of light. In the case of retinal pigment epithelial cells (RPE), melanin is produced by healthy RPE as they mature. Therefore, a doubling of absorbance would indicate a doubling of the amount of melanin within a cell. By converting pixel values in an image of RPE to absorbance values, images become melanin concentration maps that can be tracked over time and non-invasively. Besides the relationship to melanin concentration, there were several advantages to using absorbance imaging but the most significant was reproducibility. Calculation of absorbance values require internal references that make values comparable between microscopes with different configurations. With QBAM imaging, each pixel value was converted to an absorbance value by dividing each pixel's intensity in an image of a sample ($I(\lambda)$) by the corresponding pixel in an image captured when no sample was present ($I_0(\lambda)$). As with most measurements, there were several factors to consider when making a measurement to ensure reproducibility. QBAM imaging mitigates some of the sources of error through a variety of procedures including benchmarking, internal calibration, and real time statistics.

Calculation of Pixel Level Absorbance

For QBAM imaging, three different images were required to calculate absorbance at every pixel: i) an image captured with the light shutter closed ($I_{Dark}(\lambda)$) at exposure time ε, ii) an image captured with the light shutter open without any sample in the field of view ($I_{Bright}(\lambda)$) at exposure time ε, and iii) an image of the sample ($I(\lambda)$). With respect to Equation 1, ($I_{Bright}(\lambda)$) was the blank reference image, ($I_0(\lambda)$), but an additional term for ($I_{Dark}(\lambda)$) needed to be included to account for the camera bias and read current, as described in Equation 3:

$$A(\lambda)_{i,j} = -\log_{10} \frac{I(\lambda)_{i,j} - I_{Dark}(\lambda)_{i,j}}{I_{Bright}(\lambda)_{i,j} - I_{Dark}(\lambda)_{i,j}} \quad \text{Equation 3}$$

The subscripts i and j indicate pixel positions at the ith row and jth column of each image. Note that the calculation of transmittance (the terms inside of the log function) is the a priori background correction method described by Young, 2001 (Young, Shading correction: compensation for illumination and sensor inhomogeneities. Curr. Protoc. Cytom. Chapter 2, Unit 2.11, (2001)). This means that calculation of pixel level absorbance inherently corrects for uneven illumination and was one factor that makes QBAM imaging robust across microscope configurations.

Calculation of Pixel Level Confidence Intervals

From Equation 3, there were three different measurements made to calculate absorbance, each with its own potential source of error. To improve reproducibility of pixel level absorbance measurements, the QBAM imaging method uses statistics to calculate confidence intervals for the absorbance value at every pixel. The goal of these statistical methods was to capture sufficient image data to make sure absorbance values at every pixel have a 95% confidence interval of 0.01 absorbance units (10 mAU). This means that the lower end of the dynamic range of QBAM will be 10 mAU.

The standard deviation of absorbance values was calculated in accordance with Equation 4:

$$\sigma_{A(\lambda)_{i,j}} = \sqrt{\left(\frac{\sigma_{I(\lambda)_{i,j}}}{I(\lambda)_{i,j} \ln(10)}\right)^2 + \left(\frac{\sigma_{I_{Bright}(\lambda)_{i,j}}}{I_{Bright}(\lambda)_{i,j} \ln(10)}\right)^2} \quad \text{Equation 4}$$

In Equation 4, $\sigma_{A(\lambda)_{i,j}}$ is the standard deviation of the absorbance value at location (i,j). $\sigma_{I(\lambda)_{i,j}}$ and $\sigma_{I_{Bright}(\lambda)_{i,j}}$ indicate the standard deviation in pixel intensity values for a pixel at location (i,j) in the sample image, $I(\lambda)_{i,j}$, and the bright reference image, $I_{Bright}(\lambda)_{i,j}$, respectively. Equation 4 was derived using propagation of uncertainties, and two things should be noted about the derivation. First, it was assumed that $I(\lambda)_{i,j}$ and $I_{Bright}(\lambda)_{i,j}$ were uncorrelated. This was not experimentally verified, but if the variables were correlated then an additional term would be subtracted from Equation 4, which means the standard deviation of absorbance was being overestimated by this formula. Second, ignore the error introduced by the dark reference image, $I_{Dark}(\lambda)$, was ignored, because the standard deviation of the dark reference image accounted for less than 1% of the standard deviation of absorbance.

To ensure absorbance measurements were reproducible, a criterion was placed on pixel calculations so that pixel absorbance values have a 95% confidence interval of 0.01 absorbance units. Assuming a normal distribution, as indicated in Equation 5:

$$0.01 \geq \frac{1.96 \cdot \sigma_{A(\lambda)_{i,j}}}{\sqrt{n}} \quad \text{Equation 5}$$

Where n is the number of images captured for $I(\lambda)_{i,j}$. Note that the right hand side of Equation 5 represents an overestimation of the confidence interval since n is only the images captured of the sample and does not include the number of images captured of $I_{Bright}$.

Mitigation of Chromatic Aberrations with Color Filters

When comparing images between different transmitted light microscopes, one reason that images appear to be different is the light spectrum. Everything about how the light spectrum is produced, manipulated with optical components, and collected in the microscope can be different from microscope to microscope. For example, different light sources emit different light spectra that can change with age and temperature, different objectives correct for chromatic aberrations differently, and different cameras have different sensitivities to light of different wavelengths. While the absorbance measurement can mitigate issues associated with spectral emission of the light source and spectral sensitivity of the camera for a single microscope configuration, a color filter is needed to be reproducible between imaging sessions and microscopes. For the current study, images of fixed RPE (AMD and OCA cells) were captured on a Zeiss AxioImager M2 microscope using three different color filters: 405 nm (ET405/10×, Chroma, Bellows Falls, Vt.), 548 nm (ET548/10×, Chroma, Bellows Falls, Vt.), and 640 nm (ET640/20×, Chroma, Bellows Falls, Vt.). Images of living RPE (Healthy-2 cells) were captured on a Zeiss AxioObserver Z1 using three different color filters: 461 nm (FF01-461/5-25, Semrock, Rochester, N.Y.), 541 nm (FF01-541/3-25, Semrock, Rochester, N.Y.), and 671 nm (FF01-671/3-25, Semrock, Rochester, N.Y.).

Microscope Benchmarking and Blank Image Capture

The purpose of benchmarking is to determine if pixel intensities in microscope images respond linearly to changes in lighting. For QBAM imaging, this is accomplished by finding how pixel intensity changes as camera exposure time is varied, since a doubling of the exposure time should double the pixel intensity. The benchmarking protocol calculates the following quantities: pixel intensity as a function of exposure time, pixel intensity variance as a function of mean pixel intensity, optimal exposure time, and minimum allowed pixel intensity. These quantities and their calculation are described in detail below. This benchmarking protocol is used for each image filter since the image characteristics can change with respect to wavelength.

The first step of the benchmarking protocol involves capturing images at different exposure times with the camera shutter closed and open. Prior to capturing images, the number of images, n, captured at every exposure time was defined by the user. Then the camera shutter was closed, and n-images were captured at 1 ms, 2 ms, 4 ms, etc., up to 1024 ms, and all images were saved for quality control. The camera shutter was then opened, and n-images were captured at 1 ms, 2 ms, and 4 ms. For each set of images captured at one exposure time, the mean and standard deviation of pixel intensity were calculated for every pixel. Then the exposure time was doubled, n-images were captured, and the mean and standard deviation were calculated for every pixel and this process was repeated until the images were overexposed. Overexposure at a particular exposure time was determined by $$\sqrt{\sum_{i,j} \frac{\sigma^2_{I(\lambda,\varepsilon-1)_{i,j}}}{I*J}} > \sqrt{\sum_{i,j} \frac{\sigma^2_{I(\lambda,\varepsilon)_{i,j}}}{I*J}} \qquad \text{Equation 6}$$

Where $\sigma^2_{I(\lambda,\varepsilon)_{i,j}}$ is the variance in intensity at pixel (i,j) captured at wavelength $\lambda$ and exposure time $2^\varepsilon$ ms, and I*J is the total number of pixels in the image. Since overexposure is defined by reaching the maximum pixel intensity value of the camera, the standard deviation of overexposed pixels will be 0. Therefore, Equation 6 is satisfied when the images captured at exposure time $2^\varepsilon$ have less variability than the image captured at the previous exposure time $2^{\varepsilon-1}$. However, this is a coarse test for overexposure, since the standard deviation can fall off sooner than the maximum pixel intensity value (when full well capacity is reached) while still not fitting the criterion for overexposure in Equation 6. For charge coupled devices (CCDs), it is known that pixel intensity follows a Poisson distribution, so a function to estimate the standard deviation based on pixel intensity was created as shown in Equation 7:

$$\sigma_\lambda(p) = \alpha\sqrt{p} + \beta \qquad \text{Equation 7}$$

Where $\sigma_\lambda(p)$ is the pixel intensity standard deviation at wavelength, $\lambda$, for pixel intensity, p, and $\alpha$ and $\beta$ were parameters calculated from a linear regression of mean pixel intensities to standard deviations in images captured at 1 ms, 2 ms, and 4 ms.

A linear regression was then performed to determine how pixel intensity changes with exposure time. Camera exposure times that resulted in overexposed images were excluded from the linear regression, and images were classified as overexposed if images captured at an exposure time had more than 5% error with respect to Equation 7. Following the linear regression of pixel intensity with respect to exposure time, the ideal exposure time was calculated in Equation 8 as:

$$\varepsilon_\lambda = \frac{p_D - 3\sigma_\lambda(p_D) - b}{a} \qquad \text{Equation 8}$$

Where EA is the ideal exposure time, $p_D$ is the maximum camera pixel bit depth, $\sigma_\lambda(p_D)$ is the standard deviation estimate (from Equation 7), and a and b were the slope and intercept from the linear regression of pixel intensity with respect to exposure time. The ideal exposure time is where the mean exposure time should be three standard deviations below the maximum possible pixel intensity, which minimizes the number of individual overexposed pixels.

Once the ideal exposure time was determined, the number of images to capture and average to obtain $I_{Bright}$ was calculated using Equation 9, which uses the standard deviation estimation function from Equation 7:

$$n_{Bright} = \left(\frac{1.96 + \sigma_\lambda(p_\varepsilon)}{E}\right)^2 \qquad \text{Equation 9}$$

Where $n_{Bright}$ is the number of images required to have a 95% confidence interval of E for the pixel intensity at the ideal exposure, $p_\varepsilon$. For the present study E was set to two pixel intensity units, and this represented ≈0.05% error for the 12-bit cameras used in the study. Setting E=2 allowed an approximation of Equation 9, $n_{Bright} \approx \sigma_\lambda(p_\varepsilon)^2$, but this approximation should not be used for cameras with a different bit depth.

The minimum pixel intensity ($p_{min}$) to precisely calculate absorbance was determined. Absorbance is a log-scaled function, and low pixel intensities relative to $I_{Bright}$ can have much larger errors than higher pixel intensities. During live cell imaging, if any pixels in an image had values smaller than the minimum pixel intensity, then there would be a high likelihood that the absorbance value of that pixel would not have a 95% CI that was less than 0.01. Equation 10 below uses Equation 7 and Equation 4 to estimate the smallest pixel intensity value that satisfies Equation 5:

$$p_{min} = \underset{p \in (0, p_\varepsilon)}{\operatorname{argmin}} \left( 0.01 > \frac{1.96}{\sqrt{n}} \sqrt{\frac{\sigma_\lambda(p)}{p + \ln(10)} + \frac{\sigma_\lambda(p_\varepsilon)}{p_\varepsilon + \ln(10)}} \right) \quad \text{Equation 10}$$

The minimum pixel intensity value is used during live cell imaging to adjust how images were captured to satisfy Equation 5.

Assessment of Microscope Equilibrium

A microscope used for QBAM imaging is brought to equilibrium so that it is capable of capturing images in the same field of view with little variability. Multiple factors can alter how images taken at the same field of view could change from one image capture to the next, such as a change in bulb intensity as the bulb heats up or changes in the sensitivity of the camera as it heats up from use. If images were repeatedly captured, then the microscope should reach an equilibrium state where consecutive images have marginal variability between them. The benchmarking methods described above were used to create an equilibrium metric that determined when the microscope reached equilibrium. The equilibrium metric is shown in Equation 11:

$$Eq = -\log_{10} \frac{a_t}{\sum_{i=t-6}^{i=t} \frac{a_i}{7}} \quad \text{Equation 11}$$

Where $E_q$ is the equilibrium metric, $a_t$ is the slope obtained from the linear regression of pixel intensity with respect to exposure time described in the benchmarking section, and $$\sum_{i=t-6}^{i=t} \frac{a_i}{7}$$

is the average slope from the current linear regression and the six previous linear regressions. Equation 11 is similar to the equation for absorbance (Equation 1) except the slope of pixel intensity as a function of exposure time is used to factor in fluctuations in pixel intensity as exposure time changes. The equilibrium metric $E_q$ should have a value near 0 when the microscope is at equilibrium, and a value larger or smaller than 0 if the microscope is not in equilibrium. To ensure the microscope is in equilibrium, $E_q$ was calculated at least seven times and the microscope was determined to be in equilibrium is the absolute mean value of $E_q$ values was less than $5*10^{-5}$ with no individual $E_q$ value having a magnitude larger than $10^{-4}$. If the first seven $E_q$ values do not meet the equilibrium criteria, then the older $E_q$ value is discarded and a new $E_q$ value is calculated after running the benchmarking protocol again. The process is repeated until the seven most recent $E_q$ values meet the equilibrium criteria. It was found that these equilibrium criteria were met for microscopes only after the microscope was turned on for 30 minutes to one hour. This protocol was run prior to every live RPE imaging session to ensure the microscopes used were in equilibrium.

Sample Imaging and Calculating Absorbance

After ensuring that the microscope is in equilibrium, the microscope is benchmarked and reference images were captured ($I_{bright}$ and $I_{Dark}$), and then a sample is imaged. For each field of view of the sample, n images were captured and averaged. The bright reference image was always captured when the microscope was focused on the same medium that the sample was prepared in. For fixed samples of cells mounted on microscope slides, the bright reference image was captured when focused on a blank section of the microscope glass. For live cell imaging, the bright reference image was captured in a well containing the same volume of medium in which the cells were cultured. If the average of any pixel value was less than the minimum pixel value calculated during benchmarking, $p_{min}$, then the ideal exposure time was doubled and an additional n images were captured and averaged. This process of doubling the exposure time and capturing additional images was repeated until all pixels in the averaged image were larger than $p_{min}$. All images captured at each exposure time were saved and used when converting pixels to absorbance values to increase confidence in the measurement.

To calculate absorbance for each field of view, Equation 3 was used with the mean value of n images used for $I(\lambda)_{i,j}$. For $I(\lambda)_{i,j} < p_{min}$, images captured at a longer exposure time were used to calculate absorbance at the pixel by dividing the pixel intensity by the fold increase in exposure time. Since pixel intensity follows a Poisson distribution, dividing the pixel intensity by the fold increase in exposure time decreases the standard deviation by the same factor resulting in a smaller confidence interval.

Culture, Assays, and Imaging of iRPE

Immunostaining

Tissue preparation for immunohistochemistry was done by placing wells in 4% (mass/volume) paraformaldehyde (Electron Microscopy Science, 157-4-100) for 20 minutes Immunohistochemistry blocking solution (IBS) consisted of 500 ml of 1×DPBS (Dulbecco's phosphate-buffered saline, Life Technologies, 14190250), 5% (mass/volume) bovine serum albumin (Sigma Aldrich, A3311), 0.5% (mass/volume) Triton X-100 (Sigma Aldrich, X100-100 ML), and 0.5% (mass/volume) TWEEN20 (Sigma Aldrich, P2287-100 ML). Fixed cells were washed with IBS three times and permeabilized for 2 hours with IBS at room temperature. Cells were then stained with the following primary antibody for 1 hour at room temperature: RPE65 (anti-RPE65 monoclonal antibody [1:300, Abcam, ab13826), Ezrin (monoclonal anti-ezrin antibody, 1:100, Sigma Aldrich, E8897), or GT335 (anti-polyglutamylation modification monoclonal antibody, 1:1000, Adipogen, AG-20B-0020). After primary staining, samples were washed with IBS and a goat anti-mouse IgG Alexa Fluor 594 secondary antibody (1:300, Thermo Fisher, A-11032) was added and allowed to incubate at 4° C. overnight. All antibodies were diluted with IBS solution. After overnight incubation, samples were washed with IBS and anti-ZO-1 Alexa Fluor 488 mouse monoclonal antibody (1:200, Thermo Fisher, 339188) was added and allowed to incubate for 1 hour at room temperature. Additionally, nuclei were stained with Hoechst 33342 dye (1:1000, Thermo Fisher, H3570) for 15 minutes at room temperature. After staining cells were washed with D-PBS (Dulbecco's phosphate-buffered saline, Life Technologies, 14190250) and mounted onto slides. All images were captured using a Zeiss AxioImager M2 microscope or Zeiss Axio Scan Z1 slide scanner. Z-stacks were acquired over 50

µm along the z-direction with 1.5 µm steps and the maximum intensity projection was used for all analysis.

VEGF ELISA Quantification

Vascular endothelial growth factor (VEGF) was measured from the supernatants collected weekly from each well. At least 5 well replicates were chosen for each treatment at each time and 3 technical replicates per well were measured. ELISAs were performed using a single-plex Luminex® multiplex ELISA following manufacturer's protocols (R&D Systems).

Electrophysiological Measurements

Electrical resistance measurements used for prediction of the iRPE monolayers were measured using an EVOM2 and EndOhm chamber (World Precision Instruments, EVOM2 and ENDOHM-12 respectively). Each line was measured for its resistance across 12 wells per treatment, per week. Intracellular transepithelial potential and resistance measurements in response to 1 mM potassium (Sigma Aldrich, P5405-1 KG) and 100 µM ATP (Sigma Aldrich, A9187-500 MG) were done identically to that of previous reports (Miyagishima et al., In Pursuit of Authenticity: Induced Pluripotent Stem Cell-Derived Retinal Pigment Epithelium for Clinical Applications, STEM CELLS Transl. Med. 5, 1562-1574 (2016)). Briefly, RPE monolayer cultures derived from iPSC lines were mounted on a modified "Ussing" chamber as described previously (Maminishkis et al., The P2Y2 Receptor Agonist INS37217 Stimulates RPE Fluid Transport In Vitro and Retinal Reattachment, Rat. Invest. Ophthalmol. Vis. Sci. 43, 3555-3566 (2002); Peterson et al., Extracellular ATP Activates Calcium Signaling, Ion, and Fluid Transport in Retinal Pigment Epithelium, J. Neurosci. 17, 2324-2337 (1997)). Calomel electrodes in series with Ringer's solutions and agar bridges were used to measure the transepithelial potential (TEP). The signals from intracellular microelectrodes were referenced to the basal bath to measure the basolateral membrane potential ($V_b$) and the apical membrane potential ($V_a$) was calculated by the equation: $V_a = V_b - TEP$. The total transepithelial resistance ($R_t$), and the ratio of the apical to basolateral membrane resistance ($R_A/R_B$) were obtained by passing 2-4 mA current pulses across the tissue and measuring the resultant changes in TEP, $V_a$, and $V_b$.

Gene Expression of iRPE

Total RNA was isolated using NucleoSpin RNA (Machery-Nagel, 740955) per the manufacturer's protocol. RNA was quantified using an ND-1000 spectrophotometer (Nanodrop Technologies) and the manufacturers protocol. cDNA synthesis was performed using the Script cDNA Synthesis Kit (Bio-Rad, 1708891) and the manufacturer provided protocols. Custom made gene arrays containing primers for genes: MITF, PAX6, BEST1, CLDN19, PMEL, TYR, OCA2, RPE65, RLBP1, and housekeeping genes RPL13A and B2M were purchased from Bio-rad. Sybr green based QPCR was run on a ViiA 7 Real-Time PCR System (Thermo Fisher Scientific) using an EXPRESS One-Step SYBR GreenER Kit, with premixed ROX (Thermo Fisher, 1179001K) according to the manufacturer's protocol. Each sample was run in triplicate technical replicates across at least two independent wells (2×HPI4, 3× Aphidicolin, and 5× for control). An HPI4 well had to be excluded due to extremely low RNA extraction from the well and an insufficient quantity of cDNA being amplified to measured. The average of the CT of the housekeeping genes for each well were used to determine the $-\Delta CT$ values plotted. Data was analyzed using R software (R Development Core Team, 2011).

Electron Microscopy of iRPE

Mature iRPE monolayers were fixed with 10% (mass/volume) glutaraldehyde (Electron Microscopy Sciences, 16120) overnight. Samples were then washed with D-PBS three times and immersed in 25% (mass/volume) ethanol for 10 minutes. The sample was then removed and placed in successive solutions of 50%, 75%, 90%, 95%, and 100% ethanol for 10 minutes each. After 100% ethanol emersion, the samples were removed and placed into a critical point dryer (Leica EM CPD300) and processed as per the manufacturer's protocol for red blood cells. After CPD processing, samples were gold sputter coated with 10 nm of gold and imaged using a Zeiss EVO 10 scanning electron microscope at a voltage of 10 kV and amperage of 10 µA.

Drug Treatment and Imaging

Following differentiation, iRPE from donors Healthy-1 and Healthy-2 were placed on a 12-well 0.4 µm polycarbonate transwell plate (Corning, 3401) at a seeding density of 500,000 cells/ml in 0.5 ml. Only 6 of the 12 wells were used to minimize the time spent outside of the incubator while imaging. QBAM imaging and drug treatments started 2 or 1 weeks after seeding for Healthy-1 and Healthy-2 iRPE, respectively. For each culture plate, two of the six wells were treated with either 3.0 µmol/L Aphidicolin (Sigma Aldrich, A0781-10 MG), 30.0 µM HPI4 (Hedgehog Pathway Inhibitor 4, Sigma Aldrich, H4541-25 MG), or no additives to the RPEMM culture medium. RPEMM was changed three times a week and imaged on the same day every week immediately after medium change. To prevent the culture plate lid from fogging during imaging, culture medium in wells were replaced with room temperature RPEMM (with drugs if needed) immediately before imaging since room temperature medium minimized condensation. RPEMM without drug was added to a well without any cells in it to capture the bright reference image for QBAM imaging. For each well, a 4×3 grid of overlapping images were captured (10-15% image overlap) for image stitching using a Zeiss Axiolmager M2 microscope with a 10× objective. For Healthy-2 and Healthy-1, a total of 6 plates were prepared, with 6 wells occupied in each plate, yielding 36 total wells imaged and analyzed. The iRPE from AMD samples were previously reported by Sharma et al (Sharma et al., 2018), and the iRPE from OCA donors were cultured as described above, but were only imaged after they had matured and were fixed with PFA. In total five well replicates of OCAS, six replicates from OCA9, four replicates of OCA26, eight replicates of OCA71, and four replicates of OCA103 were imaged. For AMD data 1 replicate of AMD1 Clone A, 5 replicates of AMD1 Clone B, 1 Replicate of AMD2 Clone A, 5 replicates of AMD2 Clone B, 1 replicate of AMD2 Clone C, 1 replicate of AMD3 Clone A, 5 replicates of AMD3 Clone B, and 1 replicate of AMD3 Clone C were imaged.

For iRPE imaged from donor Healthy-2, three color filters were used to capture images, but Healthy-1 were imaged using a different set of filters. The filters used to image Healthy-1 permitted a larger bandwidth of light to pass through them, and had the advantage of shorter exposure times and consequently less time spent imaging cells outside of the incubator. Healthy-1 was imaged first with the broadband filters to ensure that iRPE maturation was not negatively affected by imaging. Once it was established that Healthy-1 iRPE maturation was not negatively affected by QBAM imaging, filters with a narrow bandwidth of light were used for imaging of Healthy-2 cells. All above images were acquired using a Zeiss AxioImager M2 microscope.

Deep Neural Network Prediction of Assays

Network Architecture and Training

A deep convolutional neural network (DNN-F) was designed to predict transepithelial resistance (TER) and VEGF-Ratio. The basic structure of the network consisted of a series of preliminary convolutional layers followed by inception layers deeper in the network (Szegedy et al., Going Deeper with Convolutions, ArXiv14094842 Cs (2014)). The network takes a 1024×1024×3 image as input and produces two values as output: the TER and VEGF-Ratio values. The network was trained to predict TER values first, then a VEGF-Ratio prediction layer was added to the end of the network. The three-channel image used as an input was composed of three QBAM images captured at different wavelengths (488 nm, 561 nm, and 633 nm). The network had approximately 11 million parameters.

Prior to training, cell measurements were scaled and weighted to improve the prediction capability of the DNN-F. TER measurements were divided by 1000 and VEGF-Ratio measurements were divided by 10 to roughly scale the values to a range of 0 to 1 for training. When training began, all images were given an equal weight, but later in training weights were given to each image based on the TER value associated with the image. The weights were created by binning TER values into bins with a range of 100 Ohms, except the smallest bin, which contained TER values ranging from 0-135 Ohms. Weights were then assigned by dividing the total number of TER measurements by the number of measurements in each bin. As training continued, the weights were tapered until all weights had a value of 1.

For training, mean squared error (MSE) regression was the objective function. Standard stochastic gradient descent was used with a constant learning rate. No image pre-processing was performed prior to feeding them into the network, except for random cropping of images. Each image was 1040×1388 pixels, and images in the training data were randomly cropped immediately before feeding into the network while test data were cropped at the same location every time. Test and train data were created by assigning one culture plate as test data and the rest of the plates were used as training data (two replicates of each treatment per plate; aphidicolin, HPI4, controls). The best network was determined by finding the network with the lowest MSE in the test set.

Fluorescent Image Segmentation

A deep convolutional neural network was designed to segment RPE fluorescently labeled for a tight junction protein (ZO-1), which highlights the cell borders and enables accurate cell segmentation. The purpose of this was to have a highly accurate segmentation method to generate ground truth cell border labels for QBAM, since cell borders in QBAM images had less contrast than fluorescent images of RPE and made manual segmentation of cell borders more difficult. The approach was to 1) train a DNN (DNN-Z) to segment cell borders in ZO-1 fluorescence images using corresponding images, where the cell borders had been drawn in by expert technicians, 2) collect QBAM images and fluorescent images of RPE that had been fluorescently stained for ZO-1, 3) use the DNN-Z to segment cell borders using ZO-1 fluorescence images and 4) use the ZO-1 segmentations to train a new DNN to segment cells in QBAM images (DNN-S).

Human and Mouse Data

Images of retinal pigment epithelial (RPE) cells labeled for a cell tight junction protein zonula occluden-1 (ZO-1) were collected from a variety of human donors and under a variety of conditions. Human RPE were derived from induced pluripotent stem cells (iRPE), and iRPE were obtained from human donors that were healthy or had one of two different disease phenotypes: oculocutaneous albinism (OCA), or age-related macular degeneration (AMD). Images of iRPE came from ten different human donors in total. All iRPE were imaged after they had matured for at least six weeks, and were fixed with paraformaldehyde, labeled for ZO-1 and mounted to a microscope slide. Images were captured on three different microscopes at magnifications ranging from 10× to 40×. The human data was further supplemented with images of ZO-1 labeled whole adult mouse retina labeled for cell borders kindly provided by John Nickerson's laboratory.

Reference Segmentation Images and Post-Processing

Among many segmentation methods, the FogBank algorithm (Chalfoun et al., FogBank: a single cell segmentation across multiple cell lines and image modalities, BMC Bioinformatics 15, 431 (2014)) was chosen to segment each fluorescently labeled image. The FogBank algorithm uses thresholding derived from intensity distributions in combination with geodesic distance maps of edges to establish RPE cell regions. The FogBank segmentation results were reviewed and corrected by human subjects to obtain ground truth segmentation data. After the ground truth data was created, images were split in 256×256 tiles, resulting in 4,064 images that were 256×256 pixels in size.

Deep Convolutional Neural Network Architecture and Training for RPE Segmentation A supervised, DNN based segmentation algorithm was designed in MATLAB (R2017a) with an open-source machine learning framework, MatConvNet (Vedaldi et at., MatConvNet—Convolutional Neural Networks for MATLAB. ArXiv14124564 Cs (2014)). The same architecture was used to segment fluorescent images labeled for ZO-1 (cell tight junction stain) and to segment cells in QBAM images. The basic layer structure was the inception layers used in GoogLeNet (Szegedy et al., 2014), and the higher order structure followed the U-Net architecture (Ronneberger et al., U-Net: Convolutional Networks for Biomedical Image Segmentation. In Medical Image Computing and Computer-Assisted Intervention—MICCAI, (Springer, Cham), pp. 234-241 (2015)). The network takes a 256×256 pixel image as an input, and outputs a 200×200 pixel image where cell borders have positive pixel values and cell bodies have negative pixel values. The network had more than 15 million parameters.

To train the network, stochastic gradient descent was used with ADADELTA optimization ($\varepsilon=10^{-6}$ and $\rho=0.9$). Batch normalization was used with 10 images in each batch. An F1 score was used to determine the best network model, where correctly labeled cell borders were considered true positives. Prior to the final convolution used to classify pixels, a dropout layer was used with a 50% dropout rate. The objective function was a modified logistic log loss function, as shown in Equation 12:

$$L(x,c)=B+\log(e^B+e^{-cx}) \quad \text{Equation 12}$$

Where x is the predicted pixel class and c is the actual pixel class with c=+1 representing cell borders and c=−1 representing cell bodies, and $B=\max\{0, -cx\}$.

Image Pre-Processing

Fluorescent images were pre-processed to normalize pixel values based on region statistics, but QBAM images were not. The normalization process 1) allowed for scaling the images for faster training of the DNN, since scaling image values decreases training time, 2) helps to remove some of the local background fluorescence or improves contrast in poorly stained regions, and 3) allows images of different bit depth or contrast to be processed by the same network. QBAM images were not normalized prior to feeding into the network since the pixel values were on an absolute scale and were generally between 0 and 1. Integral images were used to calculate the local mean and standard deviation within 127×127 pixel box centered on each pixel in the image. Each pixel was normalized based on the local pixel mean and standard deviation in accordance with Equation 13:

$$z_{i,j} = \frac{p_{i,j} - \mu_{i,j}}{\sigma_{i,j}} \quad \text{Equation 13}$$

Where $p_{i,j}$ is the pixel value in row i and column j, $\mu_{i,j}$ and $\sigma_{i,j}$ were the mean and standard deviation of the 127×127 pixel region centered on pixel $p_{i,j}$, and $z_{i,j}$ is the normalized pixel value.

Assignment of Pixel Weights for DNN Training

To improve the accuracy of the DNN, the training weights of each pixel in an image were adjusted based on normalized pixel values depending on each pixel's classification. This adjustment helped the DNN to correctly label cell borders in regions with poor signal. Cell border pixels were normalized as described by Equation 1, except that $\mu_{i,j}$ and $\sigma_{i,j}$ were the mean and standard deviation of only border pixels in the 127×127 pixel region surrounding $p_{i,j}$. Then, all border pixels with $z_{i,j}>-1$ were assigned a weight of 1, and all other pixels were assigned a weight of $-z_{i,j}$. This causes all bright pixels to have a weight of one, and dim pixels were assigned a weight that is inversely proportional to the pixel intensity. The weights for cell bodies were assigned based on proximity to the cell border. A distance transform for every cell body was performed with respect to the cell border, and then the square root of the distance was used as the pixel training weight. Cell body weights were trimmed, so that all weights greater than ten were assigned a value of ten.

Training weights were applied to images during training using two different methods. The first method was the way weights were traditionally applied, where the weights were multiplied by the loss during backpropagation. The second method used the weights as the pixel class labels, c, in the logistic regression function (Equation 1). For both the first and second method, c>0 for cell borders and c<0 for cell bodies. For the first method c=±1 and for the second method c was equal to the pixel weight. It was found that the second method was better for a couple reasons. First, it yielded a higher F1 score in the test data set. Second, it was not observed that the F1 scores for the test and train data sets diverged while training the DNN (which would indicate overtraining).

Segmentation of QBAM Images

Determination of Cell Borders in QBAM Images for DNN Training

A DNN was developed to segment QBAM images (DNN-S). A subset of the samples were imaged using QBAM imaging in addition to fluorescent imaging of ZO-1, specifically the patients that had AMD. Fluorescent images were captured along with transmitted light images of iRPE. Then, QBAM imaging was used to capture images of the same region. QBAM images were registered to fluorescent images of iRPE by finding 256×256 pixel regions that had had at least 97% correlation between the transmitted light images captured during fluorescent imaging and QBAM imaging. Correlation was assessed using generalized normalized cross correlation using the Fast Fourier Transform. The fluorescent images were segmented using the DNN, and the DNN segmentation was used as the cell border label for the QBAM images. DNN

Ensemble Segmentation of QBAM Images

Unlike the DNN used to segment fluorescent images of RPE that obtained an F1 score greater than 80%, the DNN to segment QBAM images achieved an F1 score of 60%. Part of this appeared to be due to ZO-1 border fluorescence overlapping poorly with the borders observed in the QBAM images in some regions of the RPE monolayer. To improve the segmentation accuracy of the DNN-S, an ensemble approach was used where seven different networks were trained and a consensus of all networks was used to determine RPE borders in QBAM images to achieve an F1 score of 66%.

No preprocessing was performed on QBAM images before they were processed with the DNN-S. The structure of the DNN-S was the same as that used to segment the fluorescent images, except the input image had three channels instead of one. The three channels were three QBAM images captured of the same field of view, but each QBAM image was captured at a different wavelength (488 nm, 561 nm, and 633 nm).

Segmentation Preprocessing for Feature Extraction

File Selection for Healthy-2 and AMD

From a directory structure with all red, green and blue bright field images, calibration and raw images, blue-channel derived absorbance images, and ZO-1 fluorescently labelled images. For the Healthy-2 dataset (81,646 Files in 1,564 folders), 2,580 absorbance files of size 1388 pixels× 1040 pixels were selected for segmentation. For the AMD dataset, 20 absorbance images of size 2,700 pixels×3,000 pixels were chosen.

Invert Colors and Skeletonize Segmentation Results

To remove artifacts and close small gaps a binary morphological operation of closing was applied to segmented images containing cell boundaries. Further on, the segmentations were skeletonized such that the cell boundaries become one pixel thick. Next, the images were inverted so that the foreground corresponds to the interior of cells and the background to the cell border. Finally, the binary inverted images were labelled such as that each cell region was labelled with a unique id.

Removal of Peripheral Cells in Images

To compute accurate cell-level features from absorbance images over the reference segmentation masks, each mask was pre-processed to remove the segments that were touching the image border. This pre-processing step eliminates feature values that would correspond to partial cells. The same pre-processing routine was applied to the computed segmentation images when they were evaluated for accuracy of segmentation.

Image Partitioning

For the AMD dataset, the stitched FOVs into large images pose a scalability challenge on RAM during DNN-based model training. The size of FOVs varies across experimental collections. Thus, collected images were preprocessed by stitching them into a large mosaic image and then partitioning the mosaic image into 512×512 image tiles with 0% overlap.

Image Feature Extraction

Albino iRPE Feature Extraction

From a directory structure with all red, green and blue bright field images, calibration and raw images, blue-channel derived absorbance images, and ZO-1 fluorescently labelled images with 1,978 Files in 439 folders, 381 blue-channel derived absorbance files were selected for image-level feature extraction. These files correspond to 3×3 fields of views (FOVs) with 10% overlap. Due to the fact that some absorbance values were less than zero (calibration artifacts), a binary mask per image was created to eliminate those negative values from feature extraction. A feature vector was computed per absorbance image (FOV) over each corresponding mask using the web image processing pipeline (WIPP). The feature vector contains 14 intensity-based and 5 texture-based image features that were originally implemented in MATLAB (R2017a). The intensity-based features correspond to central moments and entropy characteristics. The texture-based features were derived from gray-level co-occurrence matrix (GLCM) and include contrast, homogeneity, correlation, energy and entropy. The scatter plots of features were generating using a script in R and the ggplot package and selected plots were included in of the main manuscript.

AMD and Healthy iRPE Feature Extraction

In order to extract as many cell-level features as possible, multiple widely were leveraged used image libraries for feature extraction that have been integrated into WIPP. While the feature values for the same feature definitions might vary, they provide insights on the amount of variation introduced not only by image acquisition but also by image processing. Intensity, shape and textural features were computed using feature extractors in WIPP (Bajcsy et al., Web Microanalysis of Big Image Data, Springer International Publishing (2018b)), and specifically, the MATLAB (2017a) and CellProfiler (Kamentsky et al., Improved structure, function and compatibility for CellProfiler: modular high-throughput image analysis software, Bioinformatics 27, 1179-11802011 (2011)) extractors applied to each cell region. Features corresponding to cell regions situated on the borders of the images and to very large connected regions were discarded. Table 4 below summarizes these features:

TABLE 4

List of cell feature class types extracted per cell region and the software the feature was derived from.

| Feature Name | Type | Software |
|---|---|---|
| Eccentricity | Spatial | Matlab |
| Extent | Spatial | Matlab |
| Major Axis Length | Spatial | Matlab |
| Minor Axis Length | Spatial | Matlab |
| Area | Spatial | Matlab |
| Perimeter | Spatial | Matlab |
| Equivalent Diameter | Spatial | Matlab |
| Orientation | Spatial | Matlab |
| Solidity | Spatial | Matlab |
| Euler Number | Spatial | Matlab |
| Filled Area | Spatial | Matlab |
| Convex Area | Spatial | Matlab |
| Mean Intensity | Intensity | Matlab |
| Min Intensity | Intensity | Matlab |
| Max Intensity | Intensity | Matlab |
| Standard Deviation | Intensity | Matlab |
| Contrast | Intensity | Matlab |
| Correlation | Texture | Matlab |
| Energy | Texture | Matlab |
| Homogeneity | Texture | Matlab |
| Median Intensity | Intensity | Matlab |
| Mode Intensity | Intensity | Matlab |
| Skewness | Intensity | Matlab |
| Kurtosis | Intensity | Matlab |
| Entropy | Texture | Matlab |
| Central Moment | Texture | Matlab |
| Number of Neighbors | Spatial | Matlab |
| Haralick Angular Second Moment | Texture | CellProfiler |
| Haralick Contrast | Texture | CellProfiler |
| Haralick Correlation | Texture | CellProfiler |
| Haralick Difference Entropy | Texture | CellProfiler |
| Haralick Entropy | Texture | CellProfiler |
| Haralick Difference Variance | Texture | CellProfiler |
| Haralick Inverse Difference Moment | Texture | CellProfiler |
| Haralick Sum Average | Texture | CellProfiler |
| Haralick Sum Entropy | Texture | CellProfiler |
| Haralick Sum Variance | Texture | CellProfiler |
| Haralick Variance | Texture | CellProfiler |
| Gabor Wavelet features | Texture | CellProfiler |
| Bounding Box Features | Spatial | Java |

Although Table 4 shows 40 cell features, many features have subsets such as angle or number of moments, yielding a total of 315 cell features that were measured.

Machine Learning Models of Assay Prediction

Machine learning based regression models were built on cell level features extracted from RPE cells so that the trained models could be used to predict TER and VEGF-Ratio measurements. All the models were tested and trained on identical data sets for comparability. For the prediction of TER for the Healthy donor lines treated with Aphidicolin or HPI4, data was divided into Test and Train data by assigning five culture plates as training data and a sixth as test data (2 replicates of each treatment per plate). A similar procedure was done for VEGF-Ratio predictions except that a subset of wells from plate 5 were chosen to be excluded from the training set and used as the test set (one well from each treatment). This was done because ELISAs were not performed on all well supernatants and thus only a subset of the wells were available for this analysis. The selection of these plates/wells for training/testing was done blind prior to data acquisition or analysis so as to remove any bias in sample selection.

For the AMD cell lines SML models were trained from scratch on different combinations of iRPE monolayers. A total of 18 unique training image subsets were formed, where each image subset contained test data which had images of one clone from each donor, Average performance across all 18 subsets was used to identify important features regardless of machine learning method used or clone combination used for testing. Table 5 shows all combinations in detail), which were not included in the training data.

TABLE 5

List of the 18 different tested clone subsets

| Clones Tested | TER RMSE (Q · cm2) | VEGF-Ratio RMSE |
|---|---|---|
| 1A_2A_3A | 60.7 | 0.98 |
| 1A_2A_3B | 75.5 | 0.66 |
| 1A_2A_3C | 56.5 | 0.69 |
| 1A_2B_3A | 106.8 | 1.29 |
| 1A_2B_3B | 98.4 | 0.92 |
| 1A_2B_3C | 101.2 | 0.77 |
| 1A_2C_3A | 96.1 | 1.09 |
| 1A_2C_3B | 104.1 | 0.58 |
| 1A_2C_3C | 95.2 | 0.38 |
| 1B_2A_3A | 78.9 | 0.76 |
| 1B_2A_3B | 80.3 | 0.61 |
| 1B_2A_3C | 70.9 | 0.60 |
| 1B_2B_3A | 97.2 | 1.25 |
| 1B_2B_3B | 87.7 | 1.14 |
| 1B_2B_3C | 90.2 | 1.19 |
| 1B_2C_3A | 92.6 | 0.92 |
| 1B_2C_3B | 90.2 | 0.52 |
| 1B_2C_3C | 82.3 | 0.36 |
| Mean | 86.9 | 0.82 |
| SD | 14.3 | 0.29 |

Preprocessing of Features

RPE cell features were extracted per cell. The features include intensity, shape, and textural characteristics. Once extracted the mean, standard deviation, skewness, and kurtosis of each feature for each set of cells within each image partition (described in the "Image Partitioning" Section above) was calculated. It was found that subsets of features were highly correlated and had varying amplitude ranges. In order to remove highly correlated features and normalize their dynamic range, pre-processing of features was performed. The preprocessing was applied on all features and consists of (1) z-normalization and (2) the Correlation based Feature Selection (CFS) method which removed all features with a higher than 99.5% correlation. This was done for all data sets within this manuscript independently. Thus, the highly correlated features within the combined data set of the AMD-iRPE and Healthy-2 lines were analyzed for co-correlation separately from the data set used for AMD-iRPE sample identity, which was analyzed for co-correlation separately from the Healthy-2 only data set. This led to different total counts of features used in each of these models. Normalization and removal of highly correlated variables was also performed independently of other data for the training/testing data. In order to assess DNN-S's ability to accurately segment individual cell features, and thus the most granular representation of that data, for certain data z-score regularization and feature correlation were performed on individual cell metrics, not on the mean, standard deviation, skewness, and kurtosis of cells within regions of interest. Thus, the number of metrics for this analysis was much lower than the count for other models.

Among a plethora of ML models for classification and prediction, a subset of ML models were considered that predict a continuous variable, such as TER or VEGF-Ratio measurement. This subset of ML models includes: Multi-Layer Perceptron (MLP), Linear Support Vector Machine (L-SVM), Random Forest (RF), Partial Least Squares Regression (PLSR), and Ridge Regression (RR). Identical models were chosen for donor classification tasks (except for ridge regression which has no classification format). Thus, for classification ridge regression was replaced with a Naïve Bayes (NB) classifier. For all models feature weights were scaled based on their absolute magnitude from 0 to 1 and then averages were taken across all methods to determine which features had the highest relative weight to predictions. Features with high averages indicate that these important features were consistently identified (i.e., ML model independent) and thus relatively important features for prediction. All models were trained using 10-30 k-fold cross validation and then tested on the "left-out" data that was not within the training or validation sets within the k-fold cross validations.

Multilayer Perceptron (MLP)

The MLP model approximates a nonlinear relationship between independent and dependent variables. In a multi-layer perceptron model, cell-level features were considered as independent variables and TER/VEGF values were viewed as dependent variables. An MLP model with four-layers (two hidden layers) was used, and 70 neurons used in the first hidden layer and 40 neurons used in the second hidden layer of the model. The number of hidden layers and neurons in each hidden layer were chosen empirically such that a model does not overfit the input data nor was too simple for robustly fitting the input data. To identify the features that were important for TER/VEGF prediction, Garson's algorithm was used (Garson, Interpreting neural-network connection weights, AI Expert 6, 46+(1991)) to compute the connection weights.

Linear Support Vector Machine (L-SVM)

Support vector machines construct hyperplanes in a high-dimensional space to maximize separation between data. In the case of linear support vector machines (L-SVMs) the plane is linearly correlated with each dimension/feature in the high dimensional space so that the weights of the L-SVM can be directly translated into weights/importance for features. The SVM function has terms to both optimize the penalization of the hyperplane for the "nearness" of the fit to data (cost) as well as the distance at which a penalization occurs (epsilon). Thus, while training models the cost and epsilon were iterated over a range of 0.001 to 1.2 and 0.001 to 4096, respectively. All model optimization was performed in R using the Liblinear package.

Random Forest (RF)

Random Forests use "forests" or ensembles of decision trees to predict a factor. A decision tree can be thought of as a flow diagram for decision making Decision trees are constructed from class-labeled training sequences where each node denotes a test on an attribute and each branch represents the outcome of a test, and each terminal node classifies or regresses. Random forests combine multiple deep decision trees, trained on different parts of the same training set, with the goal of reducing the variance in the decision tree output. As such the number of trees and the depth to which each tree is branched can be optimized. Here 125 trees were assessed across 5 to 1500 branches to determine optimal model performance. All model optimization was performed in R using the Caret package. Relative importance of variables was calculated as shown in Liaw, A., et al., Classification and Regression by randomForest, R News 2, 18-22 (2002).

Partial Least Squared Regression (PLSR)

PLSR creates a linear regression model by projecting the predicted variables (TER and VEGF-Ratio) and the observable variables (cell image features) to a lower dimensional space. PLSR models find the multidimensional direction in the "X" space (predicted variable) that explains the maximum multidimensional variance direction in the Y space (observable variables). In this way high dimensional data can be used to predict real world outcomes. The only variable to optimize for PLSR is the number of dimensional components needed to predict the desired outcome. For the models optimized in this report components were varied from 1 to 50 to determine which had the highest predictive power. Model optimization was done using the Caret and PLS packages in R. Variable importance was defined as the sum of the absolute values of each feature coefficient within each dimensional component multiplied by the percent of the total variance each component explained of the raw data.

Ridge Regression (RR)

RR is a specialized form of ordinary least squares regression, where the predictive model is optimized to minimize the sum of squared residuals between the predicted and actual results, that includes a gamma function for removal of colinear, redundant, or confounding variables via optimizing using L2 regularization. As with ordinary least squares regression variable importance can be determined from the absolute value of the weight of the feature coefficients. Models were optimized to reduce variable numbers to fewer than 25 total features. Model optimization was done using the Caret and foba packages in R.

DNN Models to Classify Donor Identity

A DNN was created that takes two QBAM images of iRPE and determines if the iRPE come from the same donor. The input was two 1024×1024×3 pixel images. The basic layer structure consisted of low-rank expansions as described by Jaderberg et al, Speeding up Convolutional Neural Networks with Low Rank Expansions, ArXiv14053866 Cs (2014). The low-rank expansion layer consisted of a 1×3 convolutional layer followed by a 3×1 convolutional layer. The first layer had eight neurons, and each subsequent layer doubled the number of neurons relative to the previous layer. Each convolutional operation was followed by a leaky ReLU layer with a 0.1 leak value. Each low-rank expansion layer was batch normalized and then a 3×3 maximum pooling layer with a stride of 2. With the exception of the first layer, a residual layer was added prior to each maximum pooling operation, where the residual layer consisted of a 1×1 convolutional operation to scale the input layer to the same size as the output layer. The final layer was a 3×3 average pooling layer followed by a fully connected or dense convolutional layer (size=64×64×256). The best network was determined based on an F1 score. Due to the simplicity and small size of this network, networks were able to be trained on the same 18 training/testing data sets described in the following section.

Machine Learning Models to Classify Donor Identity and Outliers

Machine learning based classification models were built on cell level features extracted from RPE cells so that the trained models could be used to predict clonal outliers or donor identity. All models were assessed for their ability to classify donor identity correctly except for ridge regression model. In place of ridge regression, a naïve Bayes model was run. For the prediction of clonal outliers all data was placed into the PCA and clustering of the iRPE lines using a hierarchical clustering method.

For the AMD cell lines, SML models were trained from scratch on different combinations of iRPE monolayers. A total of 18 unique training image subsets were formed, where each image subset contained test data which had images of one clone from each donor, Table 5 shows all combinations in detail, which were not included in the training data. The approach was to use images of clones from donors to try to predict the "parent" donor line of a clone that the network had never seen before.

Principle Component Analysis (PCA)

Identification of developmental outliers was done using PCA and hierarchical clustering. PCA uses an orthogonal transformation to find the hyperplanes of maximum variance best describing the variables by converting a set of correlated variables into a set of dimensionally reduced values of linearly uncorrelated variables called principal components. In large dimensional space (e.g. large number of features) PCA is useful to dimensionally reduce the data to determine if, in aggregate, cell image features can classify different donors/clones from each other. Images were grouped at the clone and day level and the mean, standard deviation, skewness and kurtosis of each feature was calculated for each clone/day combination. These aggregate features were the placed into the PCA. Principle component 1 and 2 made up more than 75% of the total variance of the data and thus were considered a good indicator of overall sample variability. Importance of features was defined as the sum of the absolute values of each feature coefficient within each dimensional component multiplied by the percent of the total variance each component explained of the raw data. PCA was run using base R.

Hierarchical Clustering

Hierarchical clustering was done on the output of a PCA in which the mean, standard deviation, skewness, and kurtosis of individual features had been calculated for each clone. For hierarchical clustering the Euclidean distance between all clones was calculated across all principle components and the complete linkage distance was used for clustering. A split height was chosen at three branches to represent the three donors used in the study. Clustering was done use the base R functions.

Naïve Bayes

Naive Bayesian models describes the probability of a cell type being from a donor, based on the prior probability of cells being from that donor with a given set of features. Naive Bayesian models assume strong (naive) independence between the features, i.e. a Naive Bayesian classifier considers each of the cell image features to contribute independently to the probability that a cell is from a given donor regardless of any possible correlations between the each feature. Models were optimized for the amount of Laplacian correction needed from 0.0 to 0.1 and whether a normal or kernel density for the features was needed. Feature importance was obtained from the absolute values of the feature coefficients in the best fit model. Model optimization was done using the Caret and klaR packages in R.

Quantification and Statistical Analysis

All significance between groups indicated for albino lines were done using a linear mixed effect model controlling for repeated measures from a single well over time and for multiple images being taken per well. These models were assessed using the multicomp and the nlme packages in R. $R^2$ values, confidence intervals, and Kolmogorov-Smirnov statistics were calculated in base R.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for non-invasively predicting characteristics of one or more cells and cell derivatives, the method comprising:
   training a machine learning model using at least one of a plurality of training cell images representing a plurality of cells and data identifying characteristics for the plurality of cells;
   receiving at least one test cell image representing at least one test cell being evaluated, the at least one test cell image being acquired by quantitative bright-field absorbance microscopy (QBAM);
   providing the at least one test cell image to the trained machine learning model;
   predicting, using machine learning based on the trained machine learning model, characteristics of the at least one test cell; and
   generating, by the trained machine learning model, release criteria for clinical preparations of cells based on the predicted characteristics of the at least one test cell.

2. The method of claim 1, wherein the machine learning model comprises a deep neural network.

3. The method of claim 2, wherein the method further includes classifying the at least one test cell based on the predicted characteristics.

4. The method of claim 3, wherein the classifying includes determining at least one of a cell identity, a cell function, an effect of a drug delivered, a disease state, or a similarity to a technical replicate or a previously used sample.

5. The method of claim 2, wherein the method further includes segmenting by the deep neural network an image of the at least one test image into individual cells, wherein features are visually extracted from an individual cell that was segmented.

6. The method of claim 1, wherein predicting the characteristics of the at least one test cell is performed on any of a single cell or a field of view of multiple cells in the at least one test cell image.

7. The method of claim 1, wherein the predicting includes identifying at least one feature of the at least one test cell using the trained machine learning model and predicting the characteristics of the at least one test cell using the at least one feature identified.

8. The method of claim 7, wherein the at least one feature identified includes at least one of a cell boundary, a cell shape, or a plurality of texture metrics.

9. The method of claim 8, wherein the plurality of texture metrics include a plurality of sub-cellular features.

10. The method of claim 1, the method further comprising:
    receiving at least one microscopy image captured by a microscope; and
    converting pixel intensities of the at least one microscopy image to absorbance values.

11. The method of claim 1, the method further comprising at least one of:
    calculating an absorbance confidence of the absorbance values;
    establishing a microscope equilibrium through benchmarking; and
    applying a color filter when acquiring the images.

12. The method of claim 1, wherein predicting the characteristics of the at least one test cell include at least one of predicting a trans-epithelial resistance (TER) and polarized vascular endothelial growth factor (VEGF) secretion, predicting a function of the at least one test cell, predicting a maturity of the at least one test cell, predicting whether the at least one test cell is from an identified donor, or determining whether the at least one test cell is an outlier relative to known classifications.

13. The method of claim 1, wherein the plurality of cells and the at least one test cell comprise at least one of embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), or cancer stem cells (CSC).

14. The method of claim 1, wherein the plurality of cells and the at least one test cell are derived from a plurality of the at least one of ESCs, iPSCs, NSCs, RPESCs, MSCs or HSCs or any cells derived therefrom.

15. The method of claim 14, wherein the plurality of cells and the at least one test cell comprise primary cell types derived from human or animal tissue.

16. The method of claim 1, wherein the predicted characteristics comprise at least one of physiological, molecular, cellular, and/or biochemical characteristics.

17. The method of claim 1, wherein the plurality of cell images and the at least one test cell image comprise fluorescent, chemiluminescent, radioactive, or bright-field images.

18. The method of claim 1, further comprising;
determining that a test image of the at least one test image is a large image;
dividing the large image into at least two tiles;
providing each of the tiles to the trained machine learning model individually;
combining output of processing by the trained machine learning model associated with each of the tiles; and
providing the combined output for predicting characteristics of the at least one test cell into a single output that corresponds to the large image.

19. A computing system for non-invasively predicting characteristics of one or more cells and cell derivatives, the computing system comprising:

a memory configured to store instructions;
a processor disposed in communication with the memory, wherein the processor, upon execution of the instructions is configured to:
train a machine learning model using at least one of a plurality of training cell images representing a plurality of cells and data identifying characteristics for the plurality of cells;
receive at least one test cell image representing at least one test cell being evaluated, the at least one test cell image being acquired by quantitative bright-field absorbance microscopy (QBAM);
provide the at least one test cell image to the trained machine learning model;
predict, using machine learning based on the trained machine learning model, characteristics of the at least one test cell; and
generate, by the trained machine learning model, release criteria for clinical preparations of cells based on the predicted characteristics of the at least one test cell.

* * * * *